(12) United States Patent
Namise

(10) Patent No.: US 10,616,007 B2
(45) Date of Patent: Apr. 7, 2020

(54) TRANSMISSION DEVICE AND COMMUNICATION SYSTEM

(71) Applicant: Sony Corporation, Tokyo (JP)

(72) Inventor: Tomohiro Namise, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/070,055

(22) PCT Filed: Jan. 16, 2017

(86) PCT No.: PCT/JP2017/001238
§ 371 (c)(1),
(2) Date: Jul. 13, 2018

(87) PCT Pub. No.: WO2017/138303
PCT Pub. Date: Aug. 17, 2017

(65) Prior Publication Data
US 2019/0028306 A1    Jan. 24, 2019

(30) Foreign Application Priority Data

Feb. 8, 2016    (JP) .................................. 2016-022012

(51) Int. Cl.
*H04L 25/02* (2006.01)
*H04L 25/49* (2006.01)

(52) U.S. Cl.
CPC ...... *H04L 25/0266* (2013.01); *H04L 25/0272* (2013.01); *H04L 25/4904* (2013.01); *H04L 25/4917* (2013.01); *H04L 25/4923* (2013.01)

(58) Field of Classification Search
CPC ............. H04L 25/0266; H04L 25/4923; H04L 25/0272; H04L 25/4904; H04L 25/4917
See application file for complete search history.

(56) References Cited

U.S. PATENT DOCUMENTS

| 8,064,535 | B2 | 11/2011 | Wiley | |
|---|---|---|---|---|
| 9,143,362 | B2* | 9/2015 | Wiley | .................... H04L 25/02 |
| 9,762,237 | B1* | 9/2017 | Isakanian | ........... H03K 19/0005 |
| 2004/0264267 | A1* | 12/2004 | Nishio | ................ G11C 7/1006 |
| | | | | 365/198 |
| 2008/0123792 | A1* | 5/2008 | Prete | ........................ H04L 7/06 |
| | | | | 375/362 |
| 2015/0288335 | A1* | 10/2015 | Hoyerby | ................ H03F 3/217 |
| | | | | 330/251 |
| 2016/0373064 | A1* | 12/2016 | Lin | ...................... H04B 1/0458 |

FOREIGN PATENT DOCUMENTS

| JP | 06-261092 A | 6/1994 |
|---|---|---|
| JP | 2012-169953 A | 9/2012 |
| JP | 2013-192047 A | 9/2013 |

* cited by examiner

*Primary Examiner* — Dac V Ha
(74) *Attorney, Agent, or Firm* — Michael Best & Friedrich LLP

(57) ABSTRACT

A transmission device according to the disclosure includes: a controller that selects one of a plurality of operation modes; and a first transmitter that includes a first capacitance setting section that sets a load capacitance in accordance with an operation mode selected by the controller, and is configured to be able to output, to a first output terminal, a first signal having a signal format according to the selected operation mode, among a plurality of signal formats.

18 Claims, 15 Drawing Sheets

[ FIG. 1A ]
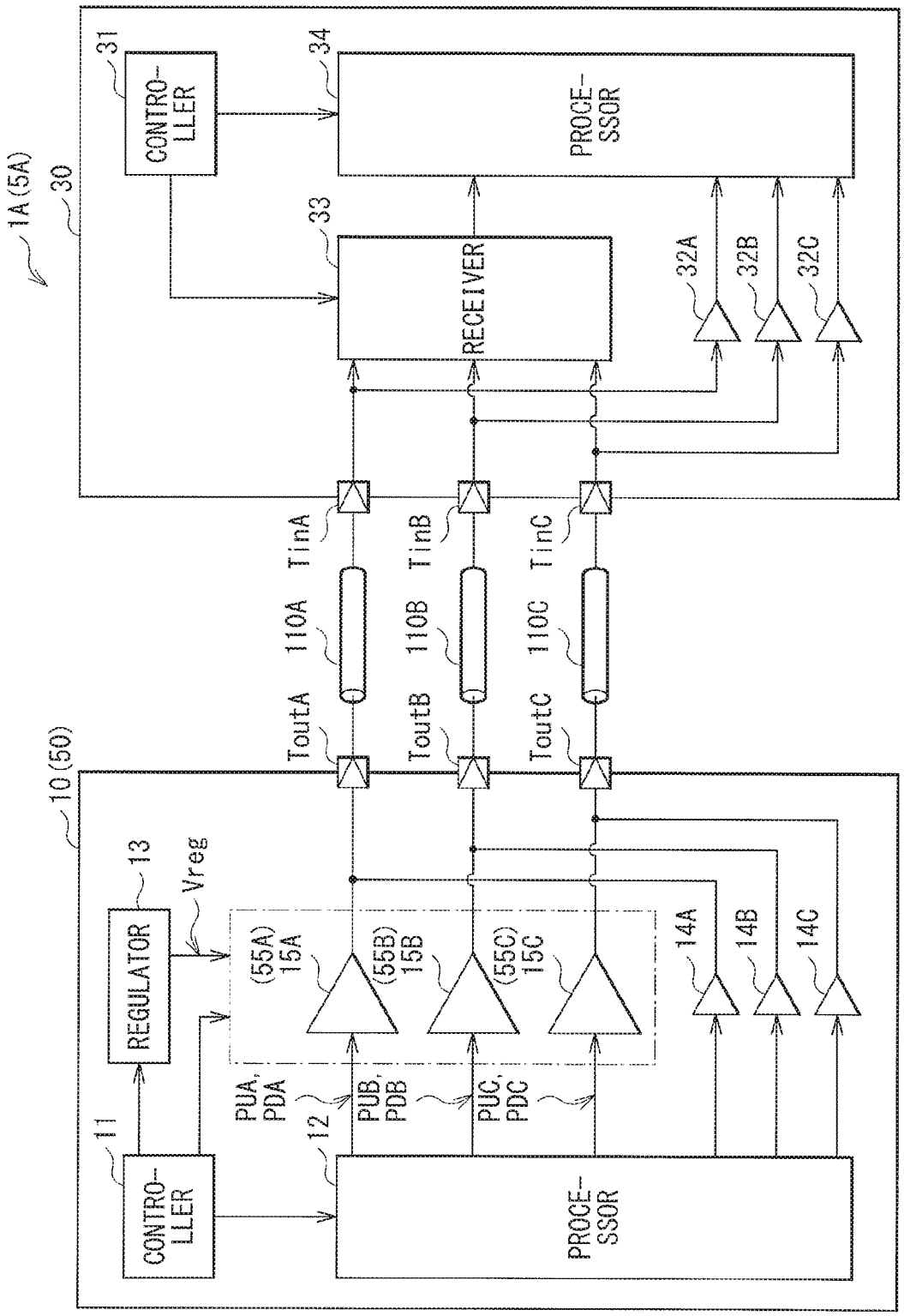

[ FIG. 1B ]
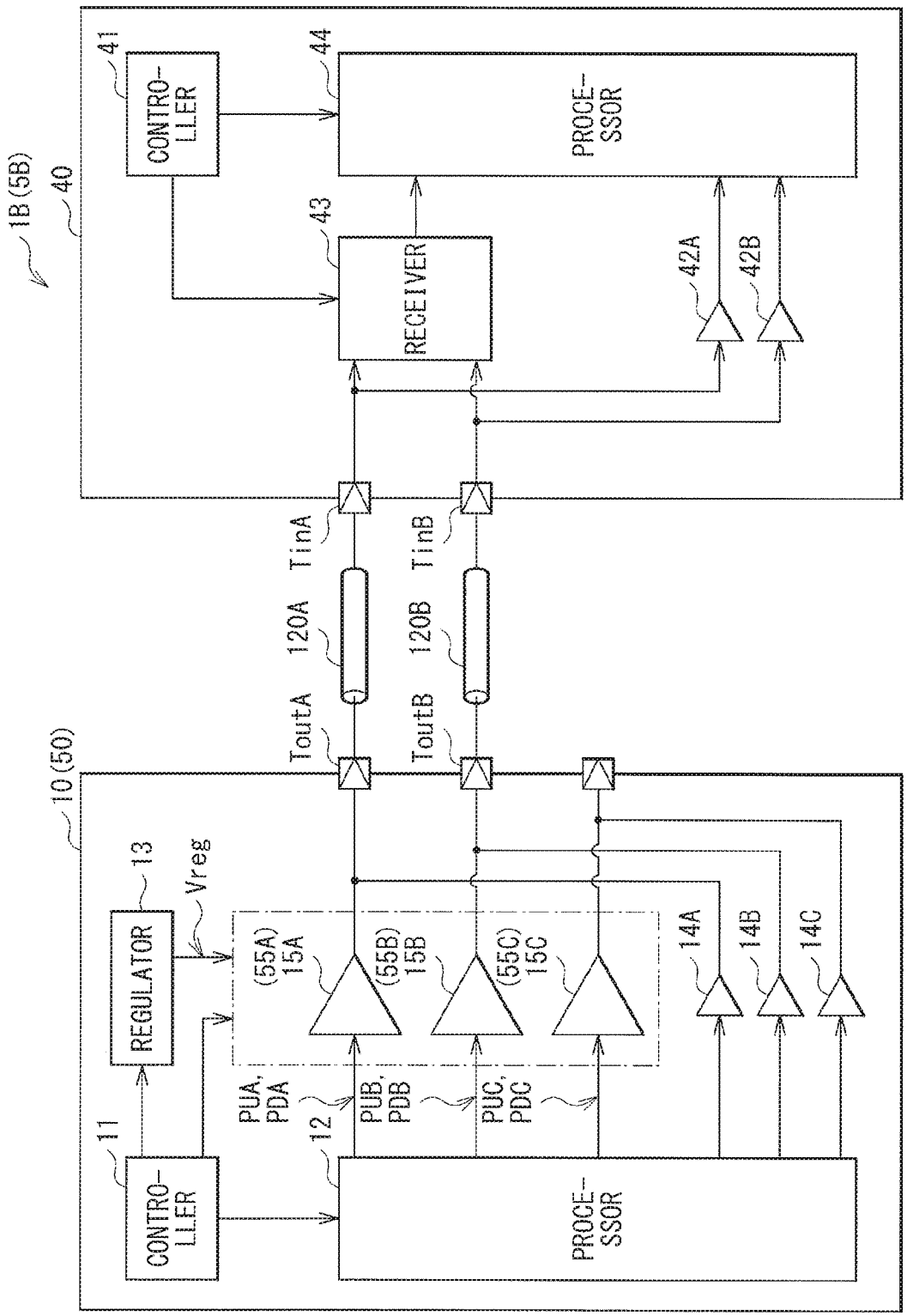

[ FIG. 2 ]
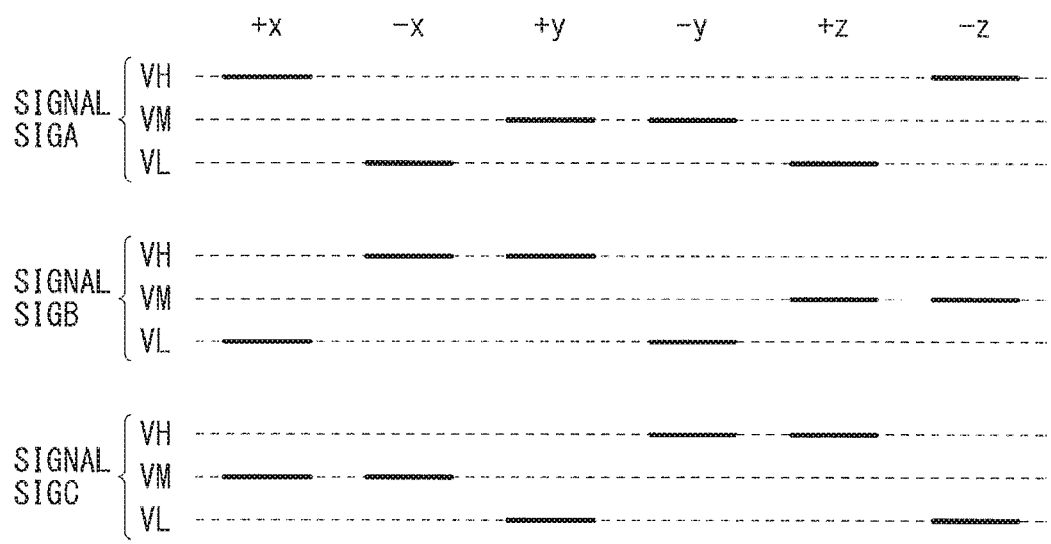
[ FIG. 3 ]
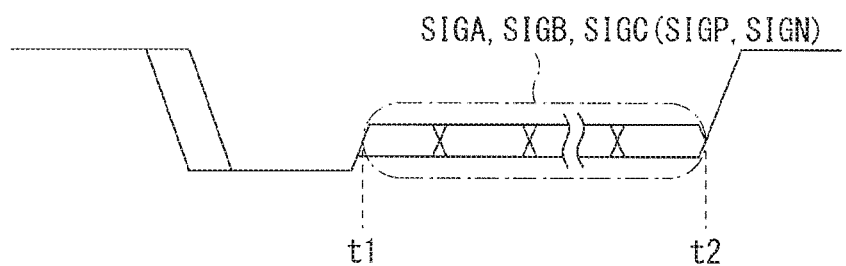

[FIG. 4]
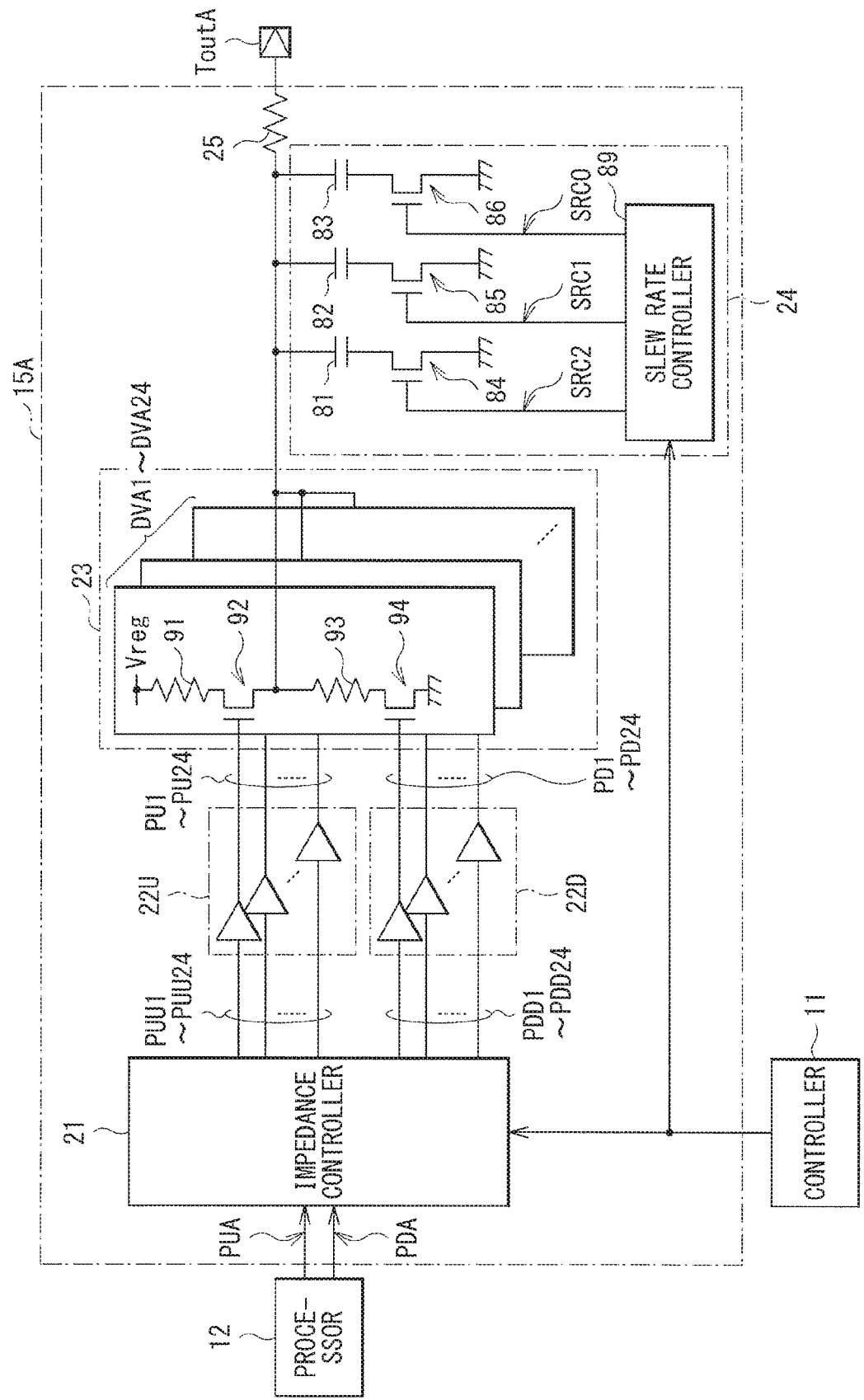

[ FIG. 5 ]
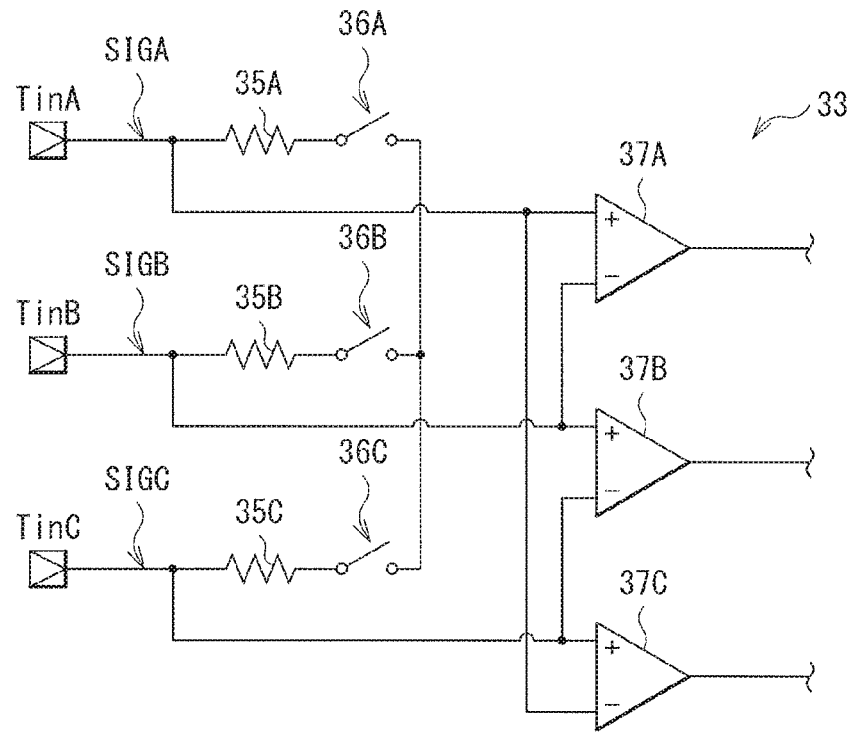
[ FIG. 6 ]
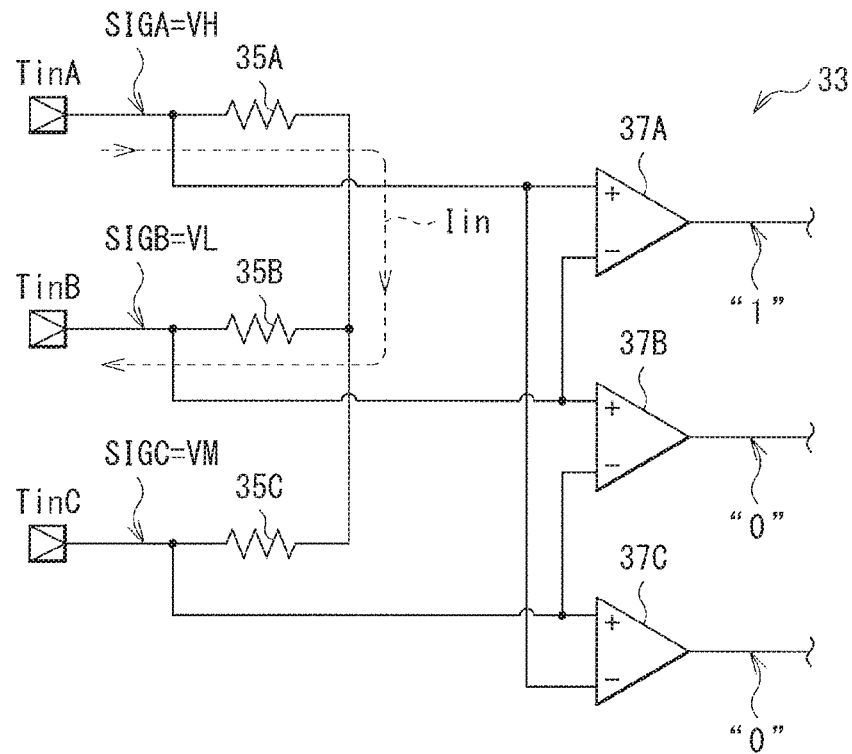

[ FIG. 7 ]
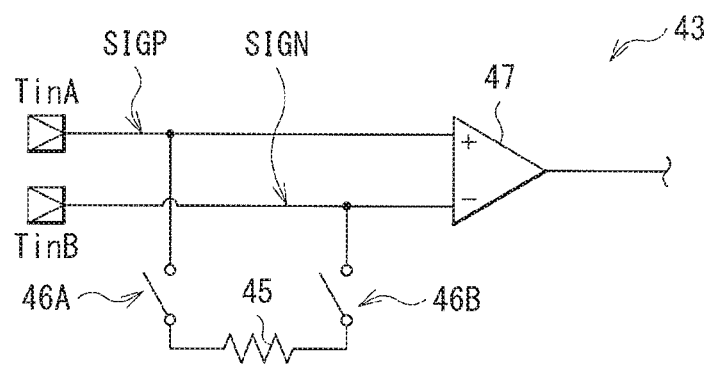
[ FIG. 8 ]
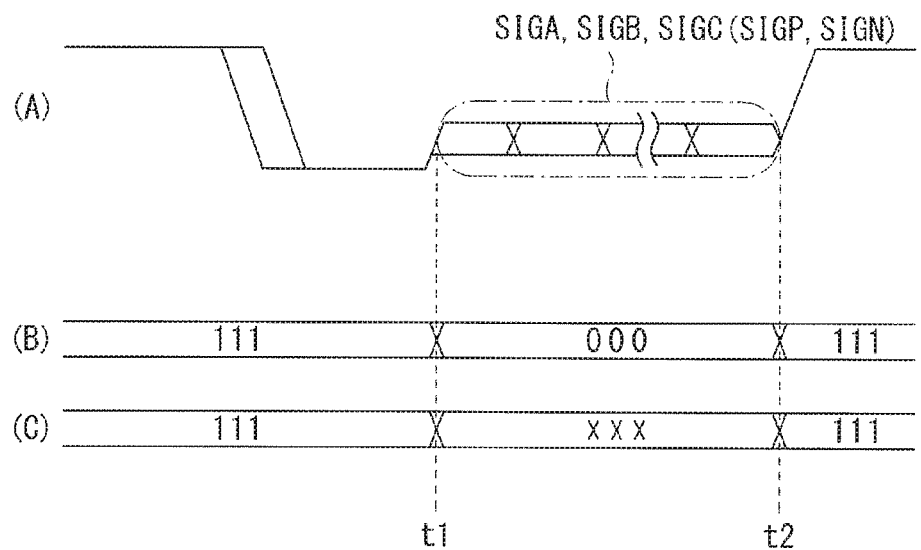

[ FIG. 9 ]
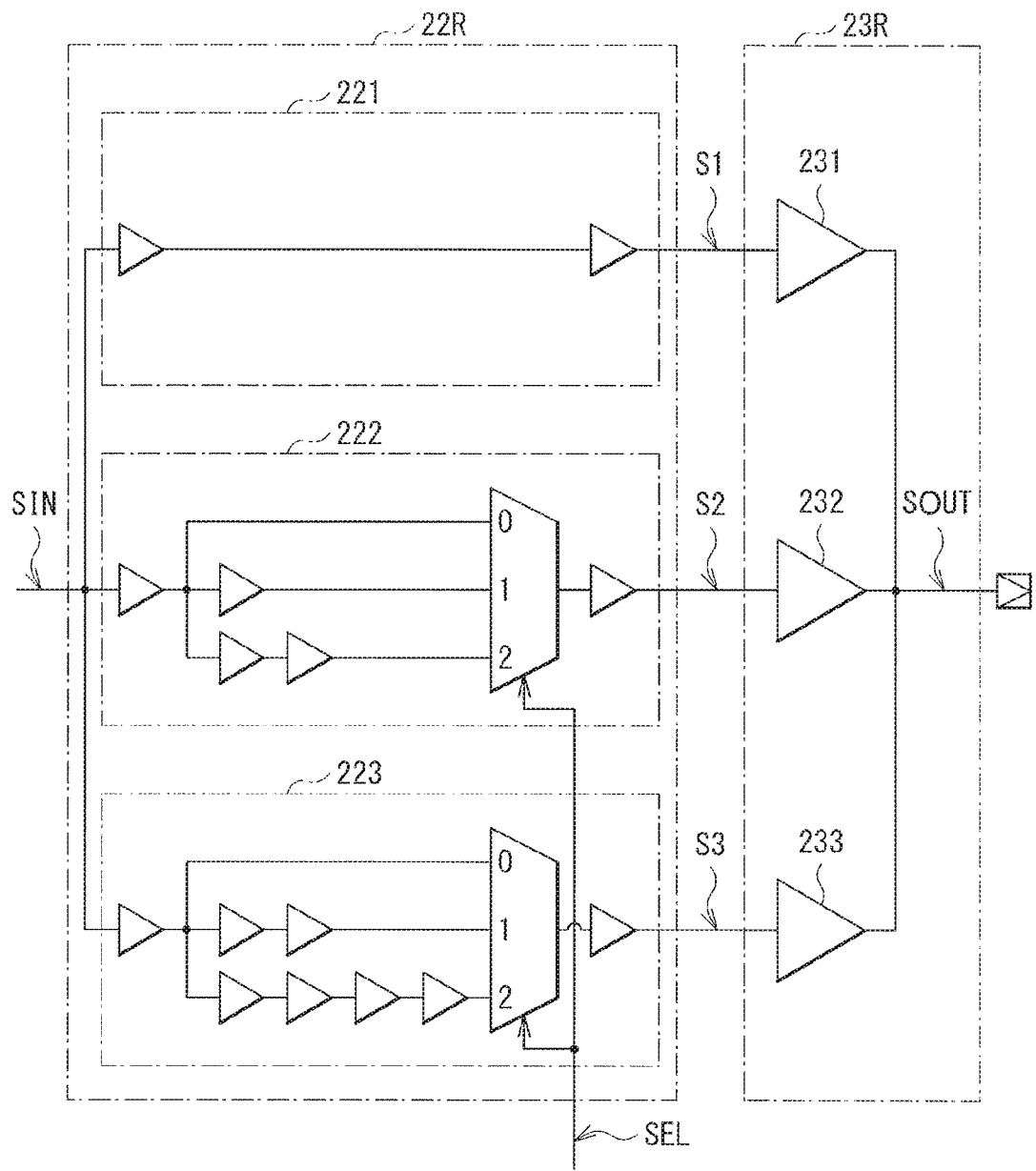

[FIG. 10]
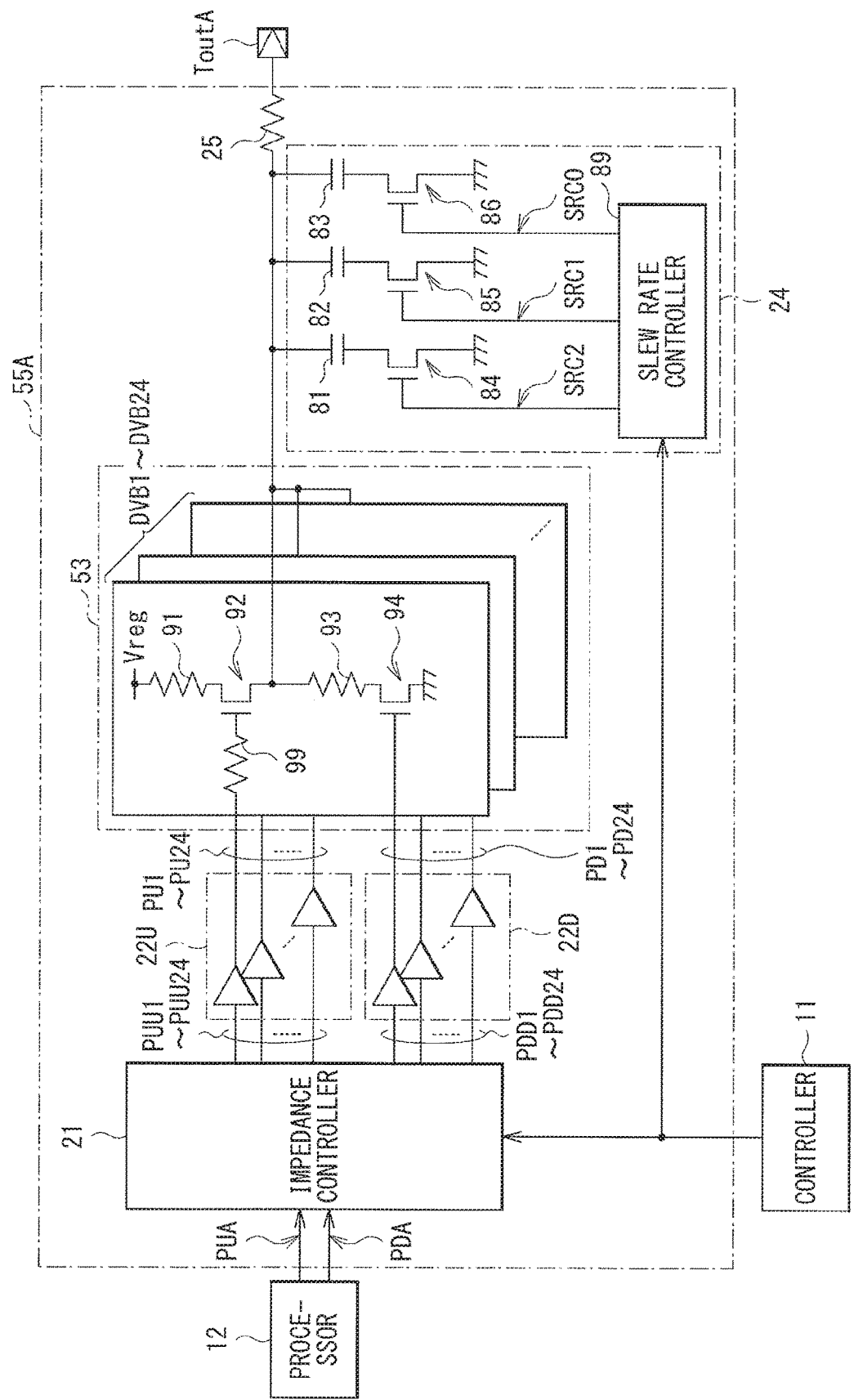

[ FIG. 11 ]
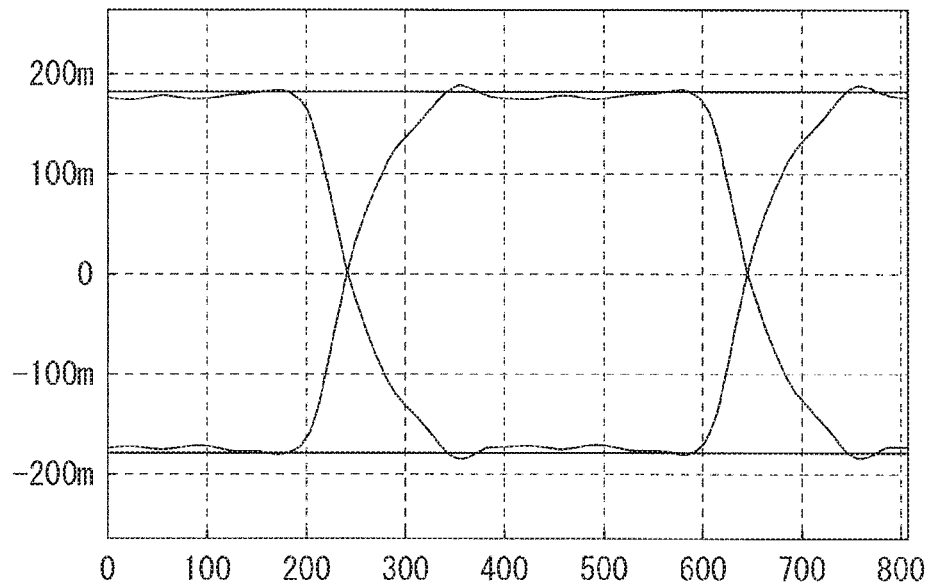
[ FIG. 12 ]
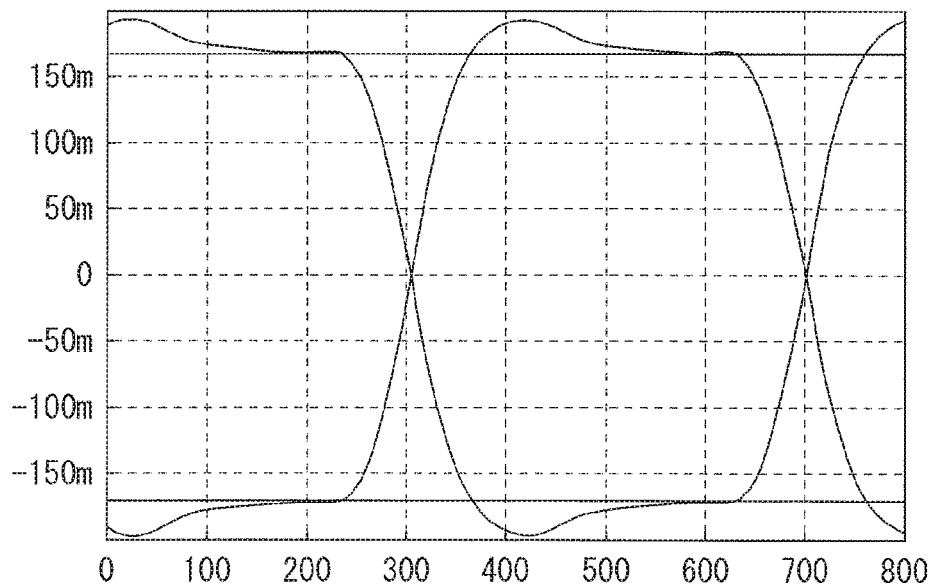

[ FIG. 13 ]
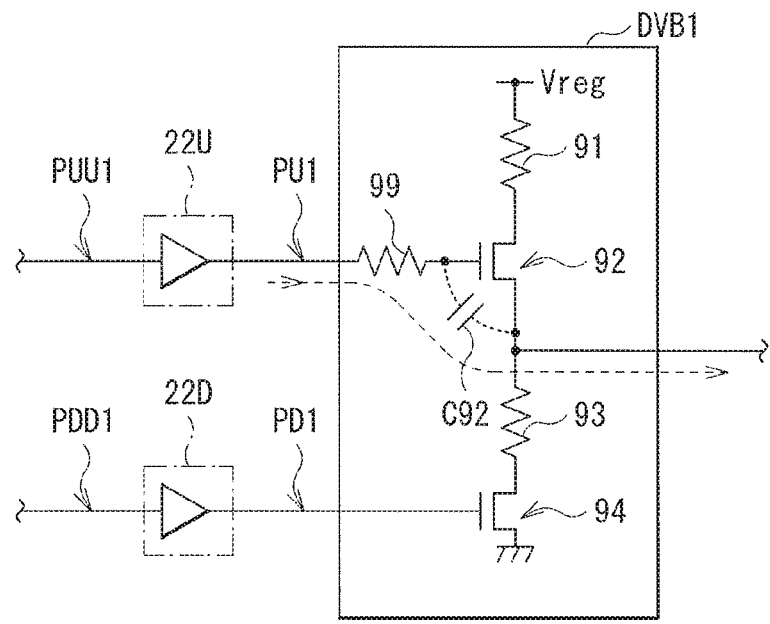
[ FIG. 14 ]
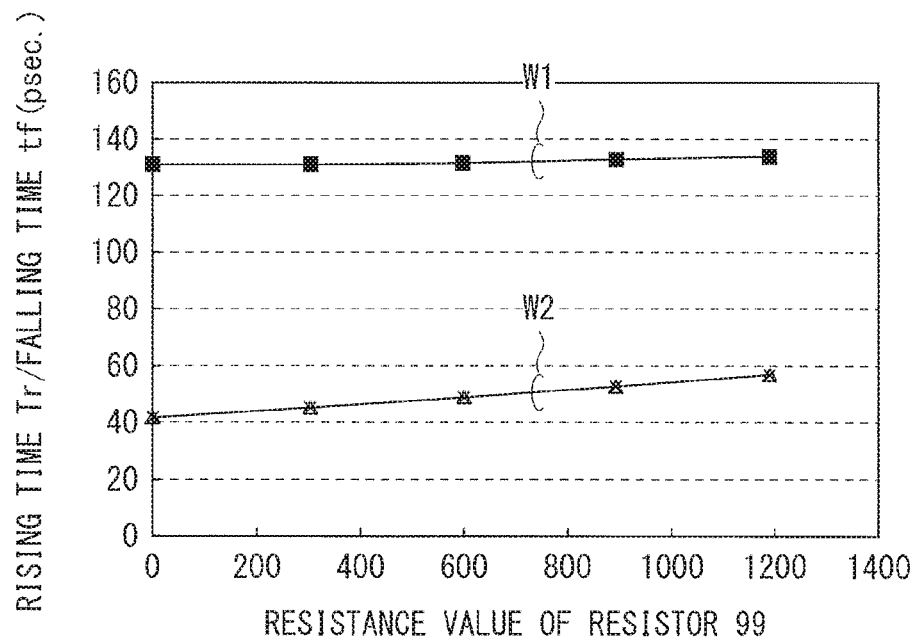

[ FIG. 15 ]
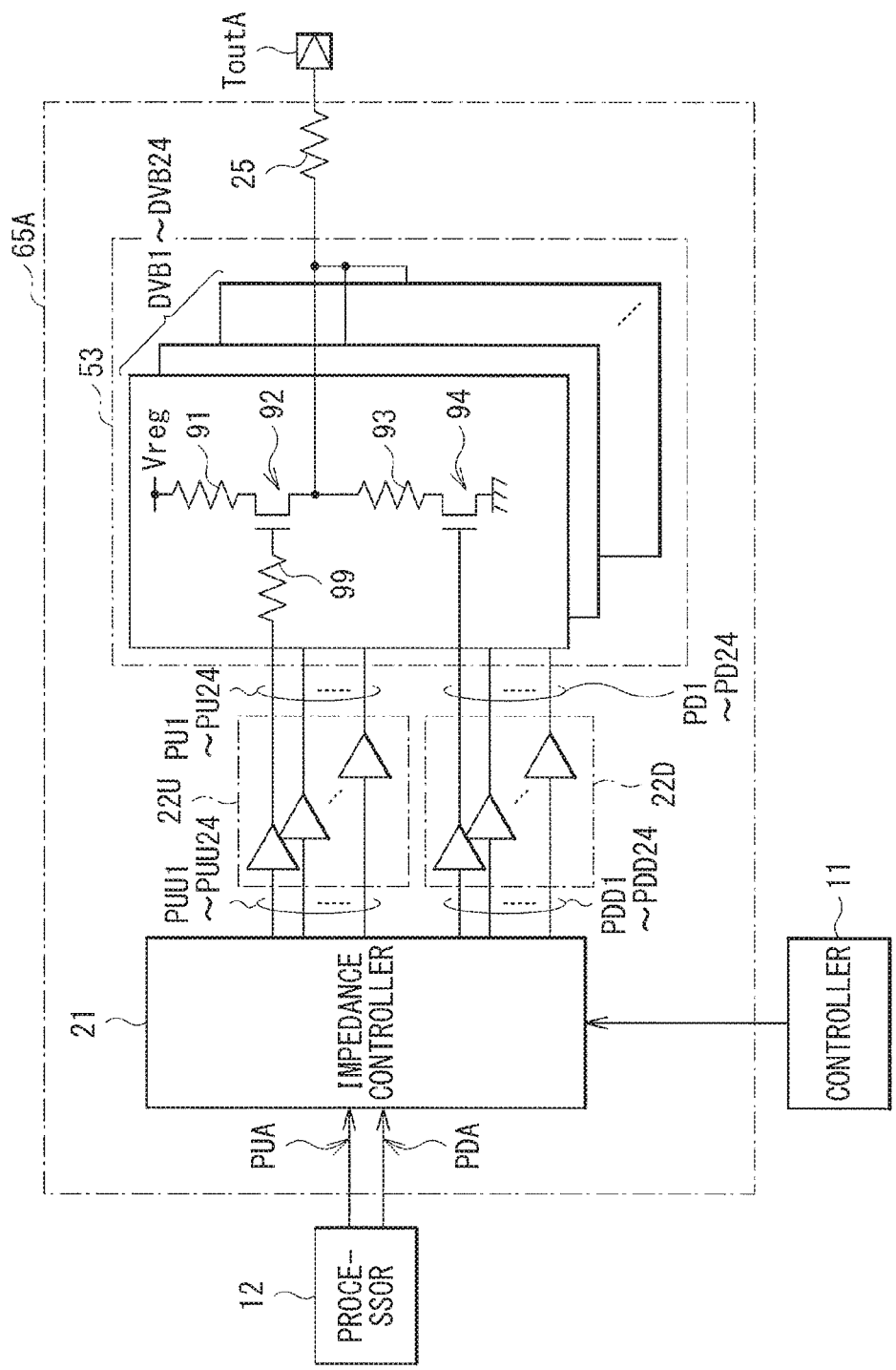

[ FIG. 16 ]
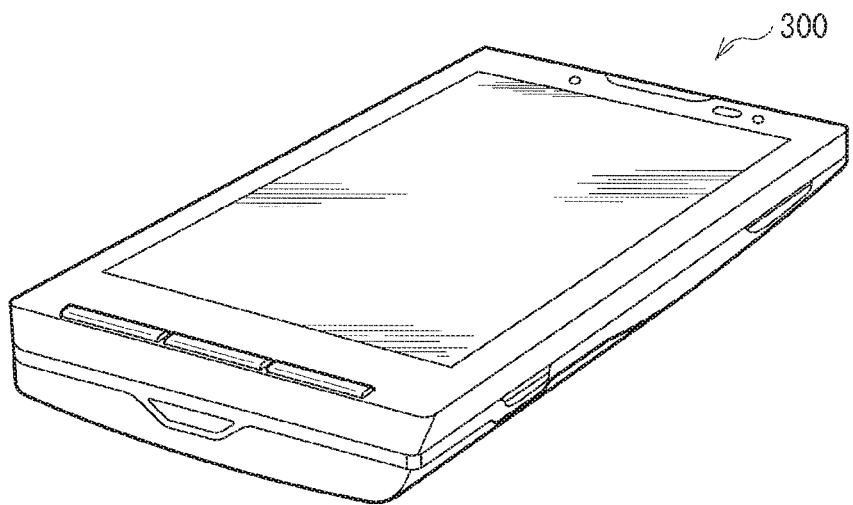

[FIG. 17]
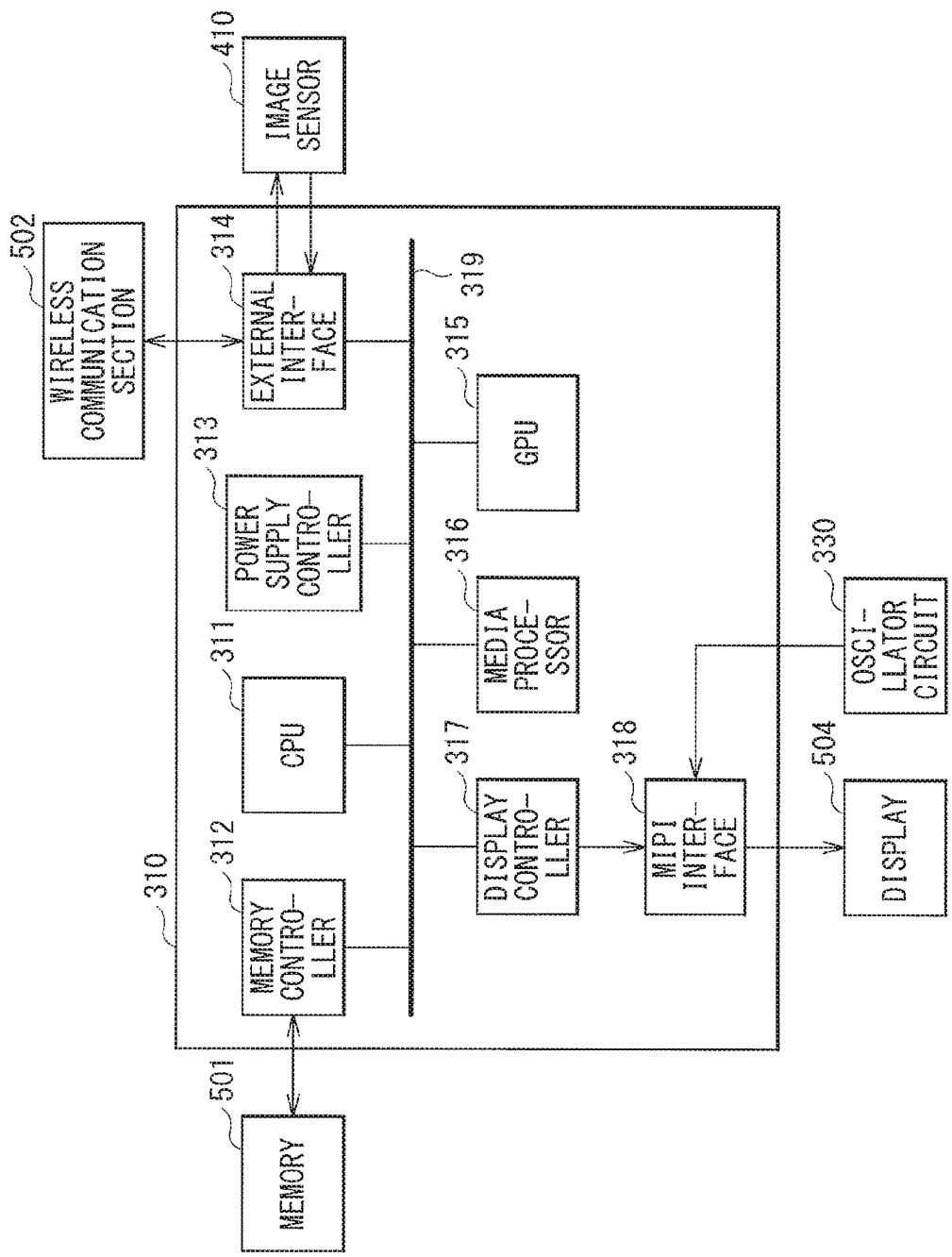

[ FIG. 18 ]
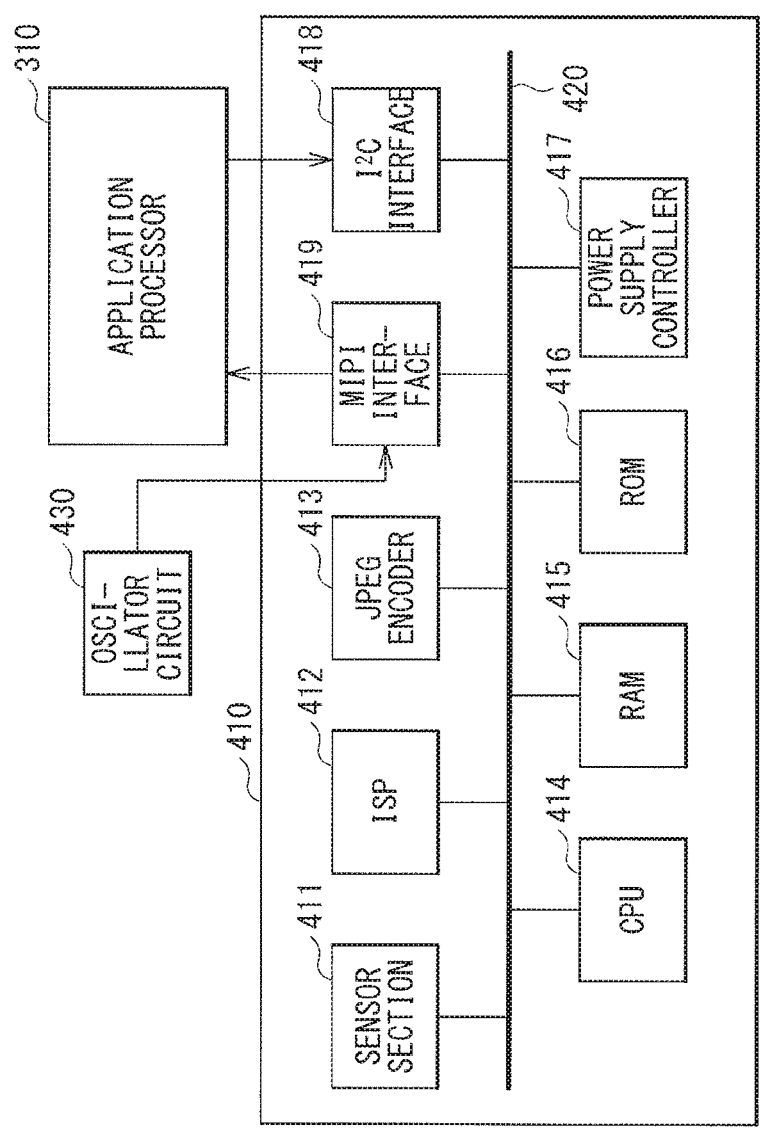

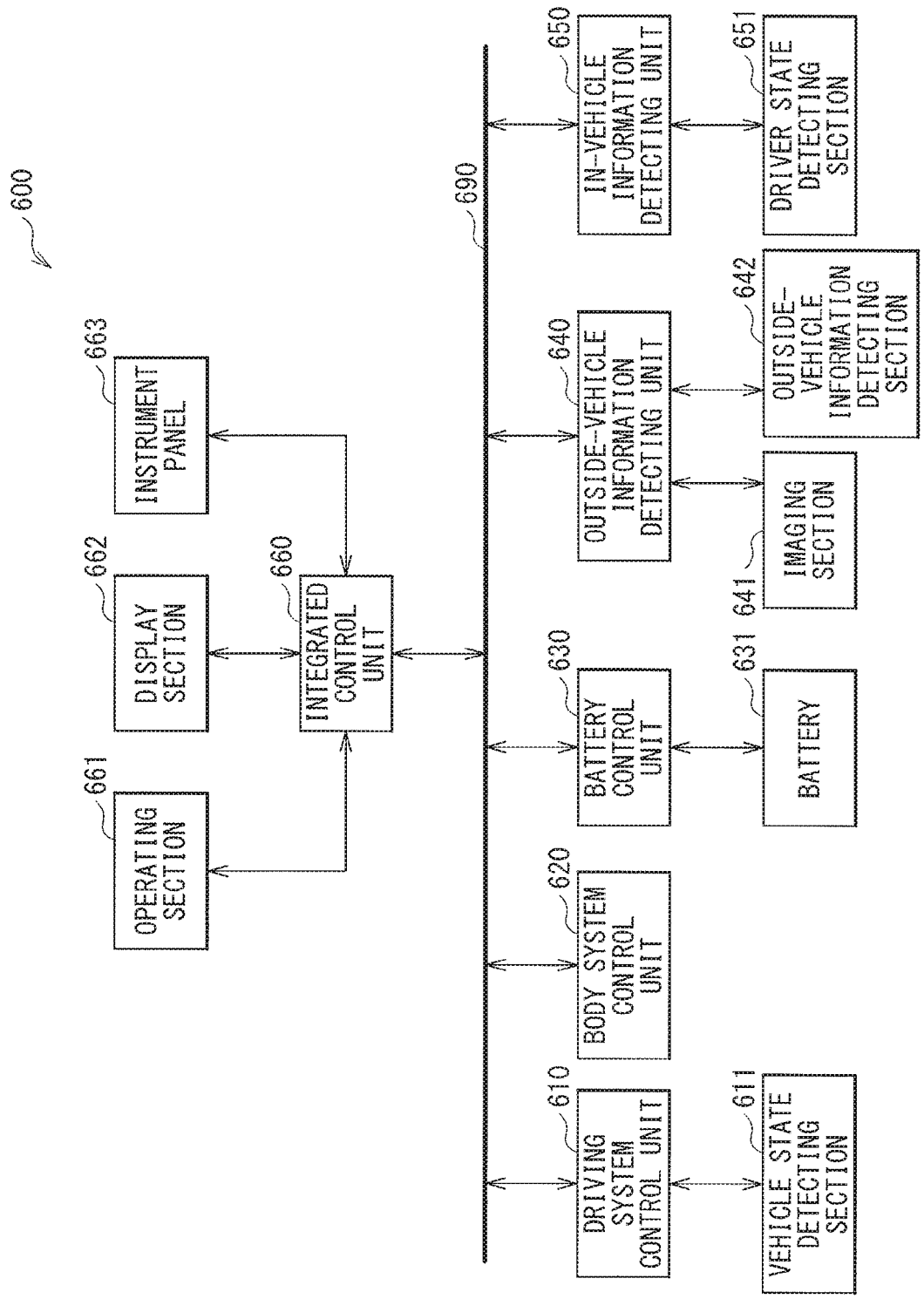
[FIG. 19]

TRANSMISSION DEVICE AND COMMUNICATION SYSTEM

TECHNICAL FIELD

The disclosure relates to a transmission device that transmits a signal, and a communication system including such a transmission device.

BACKGROUND ART

In association with high functionality and multi-functionality of electronic apparatuses in recent years, the electronic apparatuses are mounted with various devices such as a semiconductor chip, a sensor, and a display device. A lot of pieces of data are exchanged between these devices, and the amount of such data has been increased with high functionality and multi-functionality of the electronic apparatuses. Accordingly, the data are often exchanged with use of a high-speed interface. The high-speed interface is able to transmit and receive data at several Gbps, for example.

There have been disclosed various techniques for a method of further increasing transmission capacity. For example, PTL 1 and PTL 2 each disclose a communication system that transmits three differential signals using three transmission paths.

CITATION LIST

Patent Literature

PTL 1: Japanese Unexamined Patent Application Publication No. H06-261092
PTL 2: U.S. Pat. No. 8,064,535

SUMMARY OF THE INVENTION

Incidentally, an electronic apparatus is often mounted with devices supplied from various vendors. Such devices may have interfaces that are different from each other, in some cases. Accordingly, a device that exchanges data with such devices is requested to be able to achieve various interfaces.

It is desirable to provide a transmission device and a communication system that make it possible to achieve various interfaces.

A first transmission device according to an embodiment of the disclosure includes a controller and a first transmitter. The controller selects one of a plurality of operation modes. The first transmitter includes a first capacitance setting section that sets a load capacitance in accordance with an operation mode selected by the controller. The first transmitter is configured to be able to output, to a first output terminal, a first signal having a signal format according to the selected operation mode, among a plurality of signal formats.

A second transmission device according to an embodiment of the disclosure includes a controller and a first transmitter. The controller selects one of a plurality of operation modes. The first transmitter is configured to be able to output, to a first output terminal, a first signal having a signal format according to an operation mode selected by the controller, among a plurality of signal formats. The first transmitter includes a plurality of first circuits that are coupled in parallel with one another. The plurality of first circuits each include a first resistor and a first transistor that are provided on a path from a first power supply to the first output terminal, and a second resistor coupled to a gate of the first transistor.

A communication system according to an embodiment of the disclosure includes a transmission device and a reception device. The transmission device includes a controller and a first transmitter. The controller selects one of a plurality of operation modes. The first transmitter includes a first capacitance setting section that sets a load capacitance in accordance with an operation mode selected by the controller. The first transmitter is configured to be able to output, to a first output terminal, a first signal having a signal format according to the selected operation mode, among a plurality of signal formats.

In the first transmission device and the communication system according to the embodiments of the disclosure, one of a plurality of operation modes is selected, and a first signal having a signal format according to the selected operation mode is outputted to the first output terminal. At that time, a load capacitance is set in accordance with the selected operation mode.

In the second transmission device according to the embodiment of the disclosure, one of a plurality of operation modes is selected, and the first transmitter outputs, to the first output terminal, a first signal having a signal format according to the selected operation mode. The first transmitter includes a plurality of first circuits. The first circuits each include the first resistor and the first transistor that are provided on a path from the first power supply to the first output terminal. The second resistor is coupled to the gate of the first transistor.

According to the first transmission device and the communication system of the embodiments of the disclosure, a first signal having a signal format according to a selected operation mode is outputted, and a load capacitance is set in accordance with the selected operation mode. Thus, it becomes possible to achieve various interfaces.

According to the second transmission device of the embodiment of the disclosure, a first signal having a signal format according to a selected operation mode is outputted, and the second resistor coupled to the gate of the first transistor is provided. Thus, it becomes possible to achieve various interfaces.

It is to be noted that the effects described here are not necessarily limitative, and may have any of the effects described in the disclosure.

BRIEF DESCRIPTION OF DRAWINGS

FIG. 1A is a block diagram illustrating a configuration example of a communication system according to an embodiment of the disclosure.

FIG. 1B is a block diagram illustrating a configuration example of another communication system according to an embodiment of the disclosure.

FIG. 2 describes voltages of signals transmitted and received by the communication system illustrated in FIG. 1A.

FIG. 3 describes an example of signals transmitted by a transmission device illustrated in each of FIGS. 1A and 1B.

FIG. 4 is a block diagram illustrating a configuration example of a transmitter according to a first embodiment.

FIG. 5 is a circuit diagram illustrating a configuration example of a receiver illustrated in FIG. 1A.

FIG. 6 describes an example of a receiving operation in the receiver illustrated in FIG. 5.

FIG. 7 is a circuit diagram illustrating a configuration example of a receiver illustrated in FIG. 1B.

FIG. 8 is a timing chart illustrating an operation example of a capacitance setting section illustrated in FIG. 4.

FIG. 9 is a block diagram illustrating a configuration example of a transmitter according to a comparative example.

FIG. 10 is a block diagram illustrating a configuration example of a transmitter according to a second embodiment.

FIG. 11 is an eye diagram illustrating an operation example of the transmitter according to the second embodiment.

FIG. 12 is an eye diagram illustrating an operation example of the transmitter according to the comparative example.

FIG. 13 describes an operation example of a driver section illustrated in FIG. 10.

FIG. 14 is a characteristic diagram illustrating an operation example of the transmitter according to the second embodiment.

FIG. 15 is a block diagram illustrating a configuration example of a transmitter according to a modification example.

FIG. 16 is a perspective view of an appearance configuration of a smartphone to which the communication system according to an embodiment is applied.

FIG. 17 is a block diagram illustrating a configuration example of an application processor to which the communication system according to an embodiment is applied.

FIG. 18 is a block diagram illustrating a configuration example of an image sensor to which the communication system according to an embodiment is applied.

FIG. 19 is a block diagram illustrating a configuration example of a vehicle control system to which the communication system according to an embodiment is applied.

MODES FOR CARRYING OUT THE INVENTION

Hereinafter, some embodiments of the disclosure are described in detail with reference to drawings. It is to be noted that the description is given in the following order.
1. First Embodiment
2. Second Embodiment
3. Application Examples

1. First Embodiment

Configuration Example

FIGS. 1A and 1B each illustrate a configuration example of a communication system to which a transmission device (a transmission device 10) according to a first embodiment is applied. FIG. 1A illustrates a communication system 1A, and FIG. 1B illustrates a communication system 1B.

The communication system 1A includes the transmission device 10 and a reception device 30. The communication system 1A transmits a signal from the transmission device 10 to the reception device 30 using three lines 110A to 110C. The communication system 1B includes the transmission device 10 and a reception device 40. The communication system 1B transmits a signal front the transmission device 10 to the reception device 40 using two lines 120A and 120B. The transmission device 10 has four operation modes MA1, MA2, MB1, and MB2. In a case of being applied to the communication system 1A, the transmission device 10 operates in the operation mode MA1 or in the operation mode MA2. In a case of being applied to the communication system 1B, the transmission device 10 operates in the operation mode MB1 or in the operation mode MB2.

(Communication System 1A)

As illustrated in FIG. 1A, the transmission device 10 includes three output terminals ToutA, ToutB, and ToutC. The reception device 30 includes three input terminals TinA, TinB, and TinC. The output terminal ToutA of the transmission device 10 and the input terminal TinA of the reception device 30 are coupled to each other via the line 110A. The output terminal ToutB of the transmission device 10 and the input terminal TinB of the reception device 30 are coupled to each other via the line 110B. The output terminal ToutC of the transmission device 10 and the input terminal TinC of the reception device 30 are coupled to each other via the line 110C. Each of characteristic impedances of the lines 110A to 110C is about 50[Ω] in this example. In a case of being applied to such a communication system 1A, the transmission device 10 operates in the operation mode MA1 or in the operation mode MA2.

In the operation mode MA1, the transmission device 10 uses a signal having two voltage levels to transmit a data signal including control data, etc. at a bit rate of 10 [Mbps], for example. Specifically, in the operation mode MA1, the transmission device 10 outputs respective single-ended signals from the output terminals ToutA, ToutB, and ToutC. The reception device 30 receives the single-ended signals via the input terminals TinA, TinB, and TinC.

Further, in the operation mode MA2, the transmission device 10 uses a signal having three voltage levels to transmit a data signal including imaging data, etc., for example, at a symbol rate of 2.5 [Gsps], for example. Specifically, in the operation mode MA2, the transmission device 10 outputs a signal SIGA, a signal SIGB, and a signal SIGC, respectively, from the output terminal ToutA, the output terminal ToutB, and the output terminal ToutC. The reception device 30 receives the signal SIGA, the signal SIGB, and the signal SIGC, respectively, via the input terminal TinA, the input terminal TinB, and the input terminal TinC. The signals SIGA, SIGB, and SIGC each transition among three voltage levels (a high-level voltage VH, a medium-level voltage VM, and a love-level voltage VL).

FIG. 2 illustrates voltages of each of the signals SIGA, SIGB, and SIGC. The transmission device 10 uses the three signals SIGA, SIGB, and SIGC to transmit six symbols "+x", "−x", "+y", "−y", "+z", and "−z". For example, in a case of transmitting the symbol "−x", the transmission device 10 sets the signal SIGA, the signal SIGB, and the signal SIGC, respectively, to the high-level voltage VH, the low-level voltage VL, and the medium-level voltage VM. In a case of transmitting the symbol "−x", the transmission device 10 sets the signal SIGA, the signal SIGB, and the signal SIGC, respectively, to the low-level voltage VL, the high-level voltage VH, and the medium-level voltage VM. In a case of transmitting the symbol "+y", the transmission device 10 sets the signal SIGA, the signal SIGB, and the signal SIGC, respectively, to the medium-level voltage VM, the high-level voltage VH, and the low-level voltage VL. In a case of transmitting the symbol "−y", the transmission device 10 sets the signal SIGA, the signal SIGB, and the signal SIGC, respectively, to the medium-level voltage VM, the low-level voltage VL, and the high-level voltage VH. In a case of transmitting the symbol "−z", the transmission device 10 sets the signal SIGA, the signal SIGB, and the signal SIGC, respectively, to the low-level voltage VL, the medium-level voltage VM, and the high-level voltage VH.

In a case of transmitting the symbol "−z", the transmission device 10 sets the signal SIGA, the signal SIGB, and the signal SIGC, respectively, to the high-level voltage VH, the medium-level voltage VM, and the low-level voltage VL.

In a case of operating in the operation mode MA2, the transmission device 10 uses such three-phase signals (the signals SIGA, SIGB, SIGC) to transmit data signals.

FIG. 3 illustrates an example of signals transmitted from the transmission device 10. In this example, the transmission device 10 operates in the operation mode MA1 during a period until a timing t1. This allows the transmission device 10 to transmit the single-ended signal. The transmission device 10 operates in the operation mode MA2 during a period from the timing t1 to a timing t2. This allows the transmission device 10 to transmit signals SIGA, SIGB, and SIGC. The transmission device 10 operates in the operation mode MA1 during a period at and after the timing t2. This allows the transmission device 10 to transmit the single-ended signal. In this manner, the transmission device 10 operates selectively in the operation mode MA1 or in the operation mode MA2.

(Communication System 1B)

As illustrated in FIG. 1B, the transmission device 10 includes two output terminals ToutA and ToutB. The reception device 40 includes two input terminals TinA and TinB. The output terminal ToutA of the transmission device 10 and the input terminal TinA of the reception device 30 are coupled to each other via the line 120A, The output terminal ToutB of the transmission device 10 and the input terminal TinB of the reception device 30 are coupled to each other via the line 120B. Each of characteristic impedances of the lines 120A and 120B is about 50[Ω] in this example. In a case of being applied to such a communication system 1B, the transmission device 10 operates in the operation mode MB1 or in the operation mode MB2.

In the operation mode MB1, the transmission device 10 uses a signal having two voltage levels, similarly to the operation mode MA1, to transmit a data signal including control data, etc. at a bit rate of 10 [Mbps], for example. Specifically, in the operation mode MB1, the transmission device 10 outputs respective single-ended signals from the output terminals ToutA and ToutB. The reception device 40 receives the single-ended signals via the input terminals TinA and TinB.

Further, in the operation mode MB2, the transmission device 10 uses a signal having two voltage levels to transmit a data signal including imaging data, etc., for example, at a hit rate of 2.5 [Gbps], for example. Specifically, in the operation mode MA2, the transmission device 10 outputs a signal SIGP and a signal SIGN, respectively, from the output terminal ToutA and the output terminal ToutB. The signals SIGP and SIGN configure differential signals. The reception device 40 receives the signal SIGP and the signal SIGN, respectively, via the input terminal TinA and the input terminal TinB.

In the communication system 1B, similarly to the case of the communication system 1A (FIG. 3), the transmission device 10 operates selectively in the operation mode MB1 or in the operation mode MB2.

(Transmission Device 10)

The transmission device 10 includes a controller 11, a processor 12, a regulator 13, transmitters 14A, 14B, and 14C, and transmitters 15A, 15B, and 15C.

The controller 11 controls operations in the transmission device 10. Further, the controller 11 selects one of the four operation modes MA1, MA2, MB1, and MB2 to control the transmission device 10 to operate in the selected operation mode. Specifically, in a case where the transmission device 10 is applied to the communication system 1A (FIG. 1A), the controller 11 selects one of the operation mode MA1 and the operation mode MA2. In a case where the transmission device 10 is applied to the communication system 1B (FIG. 1B), the controller 11 selects one of the operation mode MB1 and the operation mode MB2.

The processor 12 performs a processing according to an operation mode on the basis of a control signal supplied from the controller 11 to supply signals to the transmitters 14A, 14B, 14C, 15A, 15B, and 15C.

For example, in the case where the transmission device 10 is applied to the communication system 1A, the processor 12 performs a predetermined processing in accordance with an operation mode selected from the operations modes MA1 and MA2 to supply the signals to the transmitters 14A, 14B, 14C, 15A, 15B, and 15C. Specifically, in a case where the transmission device 10 operates in the operation mode MA1 (a single-ended signal transmission mode), the processor 12 supplies a signal to each of the transmitters 14A, 14B, and 14C. Further, in a case where the transmission device 10 operates in the operation mode MA2 (a three-phase signal transmission mode), the processor 12 supplies signals PUA and PDA, signals PUB and PDB, and signals PUC and PDC, respectively, to the transmitter 15A, the transmitter 15B, and the transmitter 15C.

Further, for example, in the case where the transmission device 10 is applied to the communication system 1B, the processor 12 performs a predetermined processing in accordance with an operation mode selected from the operations modes MB1 and MB2 to supply the signals to the transmitters 14A, 14B, 15A, and 15B. Specifically, in a case where the transmission device 10 operates in the operation mode MB1 (the single-ended signal transmission mode), the processor 12 supplies the signal to each of the transmitters 14A and 14B. Further, in a case where the transmission device 10 operates in the operation mode MB2 (a differential signal transmission mode), the processor 12 supplies the signals PUA and PDA and the signals PUB and PDB, respectively, to the transmitter 15A and the transmitter 15B.

The regulator 13 generates a voltage Vreg on the basis of the control signal supplied from the controller 11. Specifically, in a case where the transmission device 10 operates in the operation mode MA1 or in the operation mode MA2, the regulator 13 generates a voltage VregA. In a case where the transmission device 10 operates in the operation mode MB1 or in the operation mode MB2, the regulator 13 generates a voltage VregB. For example the voltage VregA may be set as a voltage higher than the voltage VregB. The regulator 13 supplies the generated voltage Vreg (the voltage VregA or the voltage VregB) to each of the transmitters 15A, 15B, and 15C.

In the operation modes MA1 and MB1, the transmitter 14A generates the single-ended signal on the basis of the signal supplied from the processor 12, and transmits the generated single-ended signal via the output terminal ToutA. Further, the transmitter 14A also has a function of setting an output impedance to a high impedance, in the operation modes MA2 and MB2.

In the operation modes MA1 and MB1, the transmitter 14B generates the single-ended signal on the basis of the signal supplied from the processor 12, and transmits the generated single-ended signal via the output terminal ToutB. Further, the transmitter 14B also has a function of setting an output impedance to a high impedance, in the operation modes MA2 and MB2.

In the operation mode MA1, the transmitter 14C generates the single-ended signal on the basis of the signal supplied from the processor 12, and transmits the generated single-ended signal via the output terminal ToutC. Further, the transmitter 14C also has functions of setting an output impedance to a high impedance in the operation mode MA2, and of stopping the operation in the operation modes MB1 and MB2.

In the operation mode MA2, the transmitter 15A generates the signal SIGA on the basis of the signals PUA and PDA supplied from the processor 12, and transmits the generated signal SIGA via the output terminal ToutA. In the operation mode MB2, the transmitter 15A generates the signal SIGP on the basis of the signals PUA and PDA supplied from the processor 12, and transmits the generated signal SIGP via the output terminal ToutA.

In the operation mode MA2, the transmitter 15B generates the signal SIGB on the basis of the signals PUB and PDB supplied from the processor 12, and transmits the generated signal SIGB via the output terminal ToutB. In the operation mode MB2, the transmitter 15B generates the signal SIGN on the basis of the signals PUA and PDA supplied from the processor 12, and transmits the generated signal SIGN via the output terminal ToutB.

In the operation mode the transmitter 15C generates the signal SIGB on the basis of the signals PUB and PDB supplied from the processor 12, and transmits the generated signal SIGB via the output terminal ToutB. The transmitter 15C also has a function of stopping the operation in the operation modes MB1 and MB2.

FIG. 4 illustrates a configuration example of the transmitter 15A. It is to be noted that the same holds true also for the transmitters 15B and 15C. This FIG. 4 illustrates the controller 11 and the processor 12 in addition to the transmitter 15A. The transmitter 15A includes an impedance controller 21, pre-driver sections 22U and 22D, a driver section 23, and a capacitance setting section 24.

The impedance controller 21 generates signals PDD1 to PUU24 and PDD1 to PDD24 on the basis of the signals PUA and PDA and the control signal supplied from the controller 11.

The pre-driver section 22U generates signals PU1 to PU24 on the basis of the signals PUU1 to PUU24 to drive a transistor 92 (described later) of the driver section 23 using the signals PU1 to PU24. The pre-driver section 22D generates signals PD1 to PD24 on the basis of the signals PDD1 to PDD24 to drive a transistor 94 (described later) of the driver section 23 using the signals PD1 to PD24.

The driver section 23 generates the signal SIGA on the basis of the signals PU1 to PU 24 and PD1 to PD24. The driver section 23 includes twenty-four drivers DVA1 to DVA24, in this example. The driver DVA1 operates on the basis of the signals PU1 and PD1, and the driver DVA2 operates on the basis of the signals PU2 and PD2. The same holds true also for the drivers DVA3 to DVA23. The driver DVA24 operates on the basis of the signals PU24 and PD24. Respective output terminals of the drivers DVA1 to DVA24 are coupled to one another, and are coupled to the output terminal ToutA. It is to be noted that, although the twenty-four drivers DVA1 to DVA24 are provided in this example, this is not limitative; alternatively, twenty-three drivers or less or twenty-five drivers or more may be provided.

Description is given next of configurations of the drivers DVA1 to DVA24, referring to the driver DVA1 as an example. The driver DVA1 includes transistors 92 and 94, and resistors 91 and 93. The transistors 92 and 94 in this example are each an N-channel metal oxide semiconductor (MOS) field effect transistor (FET). A gate of the transistor 92 is supplied with the signal PU1, a drain of the transistor 92 is coupled to a second end of the resistor 91, and a source of the transistor 92 is coupled to a first end of the resistor 93 and is coupled to the output terminal ToutA via a resistor 25. A gate of the transistor 94 is supplied with the signal PD1, a drain of the transistor 94 is coupled to a second end of the resistor 93, and a source of the transistor 94 is grounded. A first end of the resistor 91 is supplied with the voltage Vreg, and the second end of the resistor 91 is coupled to the drain of the transistor 92. The first end of the resistor 93 is coupled to the source of the transistor 92 and is coupled to the output terminal ToutA via the resistor 25. The second end of the resistor 93 is coupled to the drain of the transistor 94. In this example, the sum of a resistance value of the resistor 91 and a resistance value of the transistor 92 in an ON state is about 1000[Ω]. Likewise, the sum of a resistance value of the resistor 93 and a resistance value of the transistor 94 in an ON state is about 1000[Ω].

With this configuration, in the case where the transmission device 10 is applied to the communication system 1A, for example, the transmitter 154 sets the voltage of the signal SIGA to one of the three voltages (the high-level voltage VH, the medium-level voltage VM, and the low-level voltage VL) on the basis of the signals PUA and FDA, for example, in the operation mode MA2 (the three-phase signal transmission mode). Specifically, for example, in a case where the voltage of the signal SIGA is set at the high-level voltage VH, the processor 12 sets the signal PUA to "1", and sets the signal PDA to "0". This allows the impedance controller 21 of the transmitter 15A to set twenty of the signals PUU1 to PUU24 to "1", and to set remaining four of the signals PUU1 to PUU24 and the signals PDD1 to PDD24 to "0". In this situation, in the driver section 23, twenty of twenty-four transistors 92 are brought into an ON state. As a result, the signal SIGA comes to have the high-level voltage VH, and the driver section 23 has an output termination resistor (output impedance) of about 50[Ω] (=1000/20). Further, in a case where the voltage of the signal SIGA is set to the low-level voltage VL, the processor 12 sets the signal PDA to "1" and sets the signal PUA to "0". This allows the impedance controller 21 to set twenty of the signals PDD1 to PDD24 to "1", and to set remaining four of the signals PDD1 to PDD24 and the signals PUU1 to PUU24 to "0". In this situation, in the driver section 23, twenty of twenty-four transistors 94 are brought into an ON state. As a result, the signal SIGA comes to have the low-level voltage VL, and the driver section 23 has an output termination resistor (output impedance) of about 50[Ω]. Further, in a case where the voltage of the signal SIGA is set to the medium-level voltage VM, the processor 12 sets both the signals PUA and PDA to "1". This allows the impedance controller 21 to set ten of the signals PUU1 to PUU24 and ten of the signals PDD1 to PDD24 to "1", and to set remaining fourteen of the signals PUU1 to PUU24 and remaining fourteen of the signals PDD1 to PDD24 to "0". In this situation, in the driver section 23, ten of the twenty-four transistors 92 are brought into an ON state, and ten of the twenty-four transistors 94 are brought into an ON state. As a result, the signal SIGA comes to have the medium-level voltage VM, and the driver section 23 has an output termination resistor (output impedance) of about 50[Ω].

It is to be noted that, in the operation mode MA1 (the single-ended signal transmission mode), the processor 12 sets both the signals PUA and PDA to "0". As a result, it becomes possible, in the driver section 23, to set the output impedance to a high impedance.

Moreover, in the case where the transmission device 10 is applied to the communication system 1B, for example, the transmitter 15A sets the voltage of the signal SIGP to a high-level voltage or a low-level voltage on the basis of the signals PUA and PDA, for example, in the operation mode MB2 (the differential signal transmission mode). Specifically, for example, in a case where the voltage of the signal SIGP is set to the high-level voltage, the processor 12 sets the signal PUA to "1", and sets the signal PDA to "0". This allows the impedance controller 21 of the transmitter 15A to set twenty of the signals PUU1 to PUU24 to "1", and to set remaining four of the signals PUU1 to PUU24 and the signals PDD1 to PDD24 to "0". As a result, the signal SIGP comes to have the high-level voltage, and the driver section 23 has an output termination resistor (output impedance) of about 50[Ω] (=1000/20). Further, in a case where the voltage of the signal SIGP is set to the low-level voltage, the processor 12 sets the signal PDA to "1" and sets the signal PUA to "0". This allows the impedance controller 21 to set twenty of the signals PDD1 to PDD24 to "1", and to set remaining four of the signals PDD1 to PDD24 and the signals PUU1 to PUU24 to "0". As a result, the signal SIGP comes to have the low-level voltage, and the driver section 23 has an output termination resistor (output impedance) of about 50 [Ω].

It is to be noted that, in the operation mode MB1 (the single-ended signal transmission mode), the processor 12 sets both the signals PUA and PDA to "0". As a result, it becomes possible, in the driver section 23, to set the output impedance to a high impedance.

The capacitance setting section 24 sets a load capacitance of the driver section 23 on the basis of the control signal supplied from the controller 11. The capacitance setting section 24 includes capacitors 81 to 83, transistors 84 to 86, and a slew rate controller 89. The capacitors 81 to 83 are each configured by a metal-oxide-metal (MOM) capacitor, for example. It is to be noted that this is not limitative; capacitors of other types may be used. A first end of the capacitor 81 is coupled to the source of the transistor 92 and the first end of the resistor 93 in each of the drivers DVA1 to DVA24, and to a first end of the resistor 25. A second end of the capacitor 81 is coupled to a drain of the transistor 84. A first end of the capacitor 82 is coupled to the source of the transistor 92 and the first end of the resistor 93 in each of the drivers DVA1 to DVA24, and to the first end of the resistor 25. A second end of the capacitor 82 is coupled to a drain of the transistor 85. A first end of the capacitor 83 is coupled to the source of the transistor 92 and the first end of the resistor 93 in each of the drivers DVA1 to DVA24, and to the first end of the resistor 25. A second end of the capacitor 83 is coupled to a drain of the transistor 86. The transistors 84 to 86 in this example are each an N-channel MOS FET. A gate of the transistor 84 is supplied with a signal SRC2, a drain of the transistor 84 is coupled to the second end of the capacitor 81, and a source of the transistor 84 is grounded. A gate of the transistor 85 is supplied with a signal SRC1, a drain of the transistor 85 is coupled to the second end of the capacitor 82, and a source of the transistor 85 is grounded. A gate of the transistor 86 is supplied with a signal SRC0, a drain of the transistor 86 is coupled to the second end of the capacitor 83, and a source of the transistor 86 is grounded. The slew rate controller 89 sets the number of transistors to be brought into an ON state among the three transistors 84 to 86 on the basis of the control signal supplied from the controller 11. It is to be noted that, although the three capacitors 81 to 83 as well as the three transistors 84 to 86 are provided in this example, this is not limitative; either two or four or more capacitors as well as either two or four or more transistors may be provided. This makes it possible, in the transmitter 15A, to set a capacitance value of the load capacitance of the driver section 23 in accordance with an operation mode. As a result, it becomes possible, in the transmitter 15A, to control a slew rate of an output signal in accordance with an operation mode.

The resistor 25 is provided to enhance resistance against electro static discharge (EST); Electro Static Discharge). A first end of the resistor 25 is coupled to an output terminal of the driver section 23 and to the first end of each of the capacitors 81 to 83. A second end of the resistor 25 is coupled to the output terminal ToutA. The resistor 25 has a resistance value of about several [Ω], for example.

(Reception Device 30)

As illustrated in FIG. 1A, the reception device 30 is used in the communication system 1A. The reception device 30 includes a controller 31, receivers 32A to 32C, a receiver 33, and a processor 34.

The controller 31 controls operations in the reception device 30. Further, the controller 31 also has a function of controlling ON/OFF of a termination resistor by supplying a control signal to the receiver 33, as described later.

In the case where the transmission device 10 operates in the operation mode MA1 (the single-ended signal transmission mode), the receiver 32A receives the single-ended signal transmitted by the transmission device 10 via the input terminal TinA. Likewise, in the case where the transmission device 10 operates in the operation mode MA1, the receiver 32B receives the single-ended signal transmitted by the transmission device 10 via the input terminal TinB. In the case where the transmission device 10 operates in the operation mode MA1, the receiver 32C receives the single-ended signal transmitted by the transmission device 10 via the input terminal TinC.

In a case where the transmission device 10 operates in the operation mode MA2 (the three-phase signal transmission mode), the receiver 33 receives the signals SIGA, SIGB, and SIGC transmitted by the transmission device 10, respectively, via the input terminals TinA, TinB, and TinC.

FIG. 5 illustrates a configuration example of the receiver 33. The receiver 33 includes resistors 35A, 35B, and 35C, switches 36A, 36B, and 36C, and amplifiers 37A, 37B, and 37C.

The resistors 35A, 35B, and 35C each serve as a termination resistor of the communication system 1A, and each have a resistance value of about 50[Ω] in this example. A first end of the resistor 35A is coupled to the input terminal TinA and is supplied with the signal SIGA, and a second end of the resistor 35A is coupled to a first end of the switch 36A. A first end of the resistor 35B is coupled to the input terminal TinB and is supplied with the signal SIGB, and a second end of the resistor 35B is coupled to a first end of the switch 369. A first end of the resistor 35C is coupled to the input terminal TinC and is supplied with the signal SIGC, and a second end of the resistor 35C is coupled to a first end of the switch 36C.

The first end of the switch 36A is coupled to the second end of the resistor 35A, and a second end of the switch 36A is coupled to respective second ends of the switches 36B and 36C. The first end of the switch 36B is coupled to the second end of the resistor 35B, and the second end of the switch 36B is coupled to the respective second ends of the switches 36A and 36C. The first end of the switch 36C is coupled to the second end of the resistor 35C, and the second end of the switch 36C is coupled to the respective second ends of the switches 36A and 36B. The switches 36A, 36B, and 36C are turned ON/OFF on the basis of a control signal supplied from the controller 31. Specifically, when the transmission device 10 operates in the operation mode MA1 and the reception device 30 receives the single-ended signal, the switches 36A, 363, and 36C are brought into an OFF state. Further, when the transmission device 10 operates in the operation mode MA2 and the reception device 30 receives the signals SIGA, SIGB, and SIGC, the switches 36A, 36B, and 36C are brought into an ON state.

A positive input terminal of the amplifier 37A is coupled to a negative input terminal of the amplifier 37C and the first end of the resistor 35A, and is supplied with the signal SIGA. A negative input terminal of the amplifier 37A is coupled to a positive input terminal of the amplifier 37B and the first end of the resistor 35B, and is supplied with the signal SIGB. The positive input terminal of the amplifier 37B is coupled to the negative input terminal of the amplifier 37A and the first end of the resistor 353, and is supplied with the signal SIGB. A negative input terminal of the amplifier 37B is coupled to a positive input terminal of the amplifier 37C and the first end of the resistor 35C, and is supplied with the signal SIGC. The positive input terminal of the amplifier 37C is coupled to the negative input terminal of the amplifier 37B and the first end of the resistor 35C, and is supplied with the signal SIGC. The negative input terminal of the amplifier 37C is coupled to the positive input terminal of the amplifier 37A and the resistor 35A, and is supplied with the signal SIGA.

With this configuration, the amplifier 37A outputs a signal corresponding to a difference AB between the signal SIGA and the signal SIGB (SIGA SIGB). The amplifier 37B outputs a signal corresponding to a difference BC between the signal SIGB and the signal SIGC (SIGB-SIGC). The amplifier 37C outputs a signal corresponding to a difference CA between the signal SIGC and the signal SIGA (SIGC-SIGA).

FIG. 6 illustrates an operational example of the receiver 33 in a case where the reception device 30 receives the symbol "+x". It is to be noted that illustration of the switches 36A, 36B, and 36C are omitted because of the ON state of each of the switches 36A, 363, and 36C. In this example, the signal SIGA is at the high-level voltage VH, the signal SIGB is at the low-level voltage VL, and the signal SIGC is at the medium-level voltage VM. In this case, a current Iin flows in order of the input terminal TinA, the resistor 35A, the resistor 359, and the input terminal TinB. Further, the positive input terminal and the negative input terminal of the amplifier 37A are supplied, respectively, with the high-level voltage VH and the low-level voltage VL to cause the difference AB to be positive (AB>0), and thus the amplifier 37A outputs "1". Further, the positive input terminal and the negative input terminal of the amplifier 37B are supplied, respectively, with the low-level voltage VL and the medium-level voltage VM to cause the difference BC to be negative (BC<0), and thus the amplifier 37B outputs "0". Furthermore, the positive input terminal and the negative input terminal of the amplifier 37C are supplied, respectively, with the medium-level voltage VM and the high-level voltage VH to cause the difference CA to be negative (CA<0), and thus the amplifier 37C outputs "0".

The processor 34 performs a predetermined processing on the basis of a signal received by each of the receivers 32A, 32B, and 32C, and the receiver 33, and on the basis of the control signal supplied from the controller 31.

(Reception Device 40)

As illustrated in FIG. 1B, the reception device 40 is used in the communication system 19. The reception device 40 includes a controller 41, receivers 42A to 42C, a receiver 43, and a processor 44.

The controller 41 controls operations in the reception device 40. Further, the controller 41 also has a function of controlling ON/OFF of a termination resistor by supplying a control signal to the receiver 43, as described later.

In a case where the transmission device 10 operates in the operation mode MB1 (the single-ended signal transmission mode), the receiver 42A receives the single-ended signal transmitted by the transmission device 10 via the input terminal TinA. Likewise, in the case where the transmission device 10 operates in the operation mode MB1, the receiver 429 receives the single-ended signal transmitted by the transmission device 10 via the input terminal TinB.

In a case where the transmission device 10 operates in the operation mode MB2 (the differential signal transmission anode), the receiver 43 receives the signals SIGP and SIGN transmitted by the transmission device 10, respectively, via the input terminals TinA and TinB.

FIG. 5 illustrates a configuration example of the receiver 43. The receiver 43 includes a resistor 45, switches 46A and 46B, and an amplifier 47. The resistor 45 serves as a termination resistor of the communication system 19, and has a resistance value of about 100[Ω] in this example. A first end of the resistor 45 is coupled to a second end of the switch 46A, and a second end of the resistor 45 is coupled to a second end of the switch 46B. A first end of the switch 46A is coupled to the input terminal TinA and is supplied with the signal SIGP, and the second end of the switch 46A is coupled to the first end of the resistor 45. A first end of the switch 46B is coupled to the input terminal TinB and is supplied with the signal SIGN, and the second end of the switch 46B is coupled to the second end of the resistor 45. The switches 46A and 46B are turned ON/OFF on the basis of a control signal supplied from the controller 41. Specifically, when the transmission device 10 operates in the operation mode MB1 and the reception device 40 receives the single-ended signal, the switches 46A and 46B are brought into an OFF state. Further, when the transmission device 10 operates in the operation mode MB2 and the reception device 40 receives the signals SIGP and SIGN, the switches 46A and 46B are brought into an ON state. The positive input terminal of the amplifier 37A is coupled to the first end of the switch 46A and is supplied with the signal SIGP, and the negative input terminal of the amplifier 37A is coupled to the first end of the switch 46B and is supplied with the signal SIGN.

The processor 44 performs a predetermined processing on the basis of a signal received by each of the receivers 42A and 42B and the receiver 43, and on the basis of the control signal supplied from the controller 41.

Here, the controller 11 corresponds to a specific example of a "controller" in the disclosure. The transmitters 15A, 15B, and 15C correspond, respectively, to specific examples of a "first transmitter", a "second transmitter", and a "third transmitter" in the disclosure. For example, the "transmitter 14A" corresponds to a specific example of a "fourth transmitter" in the disclosure. The resistor 91 corresponds to a specific example of a "first resistor" in the disclosure. The transistor 92 corresponds to a specific example of a "first transistor" in the disclosure. The operation mode MA2 corresponds to a specific example of a "first operation mode" in the disclosure, and the signals SIGA, SIGB, and SIGC correspond to a specific example of a "first signal format" in the disclosure. The operation mode MB2 corresponds to a specific example of a "second operation mode" in the disclosure, and the signals SIGP and SIGN correspond to a specific example of a "second signal format" in the disclosure.

[Workings and Effects]

Description is given next of workings and effects of the communication systems 1A and 1B of the present embodiment.

(Overview of Overall Operation)

First, description is given of an overview of an overall operation of the communication system 1A, with reference to FIGS. 1A and 4. In the transmission device 10 of the communication system 1A, the controller 11 controls operations in the transmission device 10. Further, the controller 11 selects one of the operation mode MA1 and the operation mode MA2 to control the transmission device 10 to operate in the selected operation mode. The processor 12 performs an operation corresponding to the operation mode on the basis of the control signal supplied from the controller 11, and supplies the signals to the transmitters 14A, 14B, 14C, 15A, 15B, and 15C. The regulator 13 generates the voltage Vreg (the voltage VregA) on the basis of the control signal supplied from the controller 11. In the operation mode MA1 (the single-ended signal transmission mode), the transmitters 14A, 14B, and 14C generate respective single-ended signals on the basis of the signal supplied from the processor 12, and transmit the generated single-ended signals via the output terminals ToutA, ToutB, and ToutC, respectively. In the operation mode MA2 (the three-phase signal transmission mode), the transmitters 15A, 15B, and 15C generate the signals SIGA, SIGB, and SIGC on the basis of the signals supplied from the processor 12, and transmit the generated signals SIGA, SIGB, and SIGC via the output terminals ToutA, ToutB, and ToutC, respectively.

For example, in the transmitter 15A, the impedance controller 21 generates the signals PUU1 to PUU24 and PDD1 to PDD24 on the basis of the signals PUA and PDA and the control signal supplied from the controller 11. The pre-driver section 22U generates the signals PU1 to PU24 on the basis of the signals PUU1 to PUU24 to drive the transistor 92 of the driver section 23 using the signals PU1 to PUU24. The pre-driver section 22D generates the signals PD1 to PD24 on the basis of the signals PDD1 to PDD24 to drive the transistor 94 of the driver section 23 using the signals PD1 to PD24. The driver section 23 generates the signal SIGA on the basis of the signals PU1 to PU24 and PD1 to PD24. The capacitance setting section 24 sets a load capacitance of the driver section 23 on the basis of the control signal supplied from the controller 11 in accordance with an operation mode.

In the reception device 30 of the communication system 1A, the controller 31 controls operations in the reception device 30. Further, the controller 31 also controls ON/OFF of the termination resistor by supplying the control signal to the receiver 33. In the case where the transmission device 10 operates in the operation mode MA1 (the single-ended signal transmission mode), the receivers 32A, 32B, and 32C receive the single-ended signals transmitted by the transmission device 10, respectively, via the input terminals TinA, TinB, and TinC. In the case where the transmission device 10 operates in the operation mode MA2 (the three-phase signal transmission mode), the receiver 33 receives the signals SIGA, SIGB, and SIGC transmitted by the transmission device 10, respectively, via the input terminals TinA, TinB, and TinC. The processor 34 performs a predetermined processing on the basis of the signal received by each of the receivers 32A, 32B, and 32C, and the receiver 33, and on the basis of the control signal supplied from the controller 31.

Description is given next of an overview of an overall operation of the communication system 1B, with reference to FIGS. 1B and 4. In the communication system 1B, the controller 11 selects one of the operation mode MB1 and the operation mode MB2 to control the transmission device 10 to operate in the selected operation mode. The regulator 13 generates the voltage Vreg (the voltage VregB) on the basis of the control signal supplied from the controller 11. The processor 12 performs an operation corresponding to the operation mode on the basis of the control signal supplied from the controller 11, and supplies the signals to the transmitters 14A, 14B, 15A, and 15B. In the operation mode MB1 (the single-ended signal transmission mode), the transmitters 14A and 14B generate respective single-ended signals on the basis of the signal supplied from the processor 12, and transmit the generated single-ended signals via the output terminals ToutA and ToutB, respectively. In the operation mode MB2 (the differential signal transmission mode), the transmitters 15A and 15B generate the signals SIGP and SIGN, respectively, on the basis of the signals supplied from the processor 12, and transmit the generated signals SIGP and SIGN via the output terminals ToutA and ToutB. For example, in the transmitter 15A, the capacitance setting section 24 sets a load capacitance of the driver section 23 on the basis of the control signal supplied from the controller 11 in accordance with an operation mode.

In the reception device 40 of the communication system 1B, the controller 41 controls operations in the reception device 40. Further, the controller 41 also controls ON/OFF of the termination resistor by supplying the control signal to the receiver 43. In the case where the transmission device 10 operates in the operation mode MB1 (the single-ended signal transmission mode), the receivers 42A and 42B receive the single-ended signal transmitted by the transmission device 10 via the input terminals TinA and TinB, respectively, in the case where the transmission device 10 operates in the operation mode MB2 (the differential signal transmission mode), the receiver 43 receives the signals SIGP and SIGN transmitted by the transmission device 10, respectively, via the input terminals TinA and TinB. The processor 44 performs a predetermined processing on the basis of the signal received by each of the receivers 42A and 42B and the receiver 43, and on the basis of the control signal supplied from the controller 41.

(Detailed Operation of Capacitance Setting Section 24)

The capacitance setting section 24 sets a load capacitance of the driver section 23 on the basis of the control signal supplied from the controller 11 in accordance with an operation mode. Specifically, the slew rate controller 89 of the capacitance setting section 24, in accordance with an operation mode, uses the signal SRC2, the signal SRC1, and the signal SRC0 to control ON/OFF of the transistor 84, the transistor 85, and the transistor 86, respectively. In this example, for example, in a case where the signal SRC2 is "1", the transistor 84 is brought into an ON state. In a case where the signal SRC2 is "0", the transistor 84 is brought into an OFF state. The same holds true also for the signals SRC1 and SRC0. In a case where a capacitance value of each of the capacitors 81 to 83 is set to about 250 [fF], it is possible for the capacitance setting section 24 to set a capacitance value within a range from 0 [fF] to 750 [fF] by a unit of 250 [fF]. This enables the transmitters 15A, 15B, and 15C to control a slew rate of the output signal in accordance with an operation mode.

FIG. 8 illustrates an operation example of the capacitance setting section 24. (A) of FIG. 8 indicates a waveform of each of the signals transmitted from the transmission device 10. (B) of FIG. 8 indicates an example of each of the signals SRC2, SRC1, and SRC0 in a case where the transmission device 10 is applied to the communication system 1A. (C) of FIG. 8 indicates an example of each of the signals SRC2, SRC1, and SRC0 in a case where the transmission device 10 is applied to the communication system 1B. In (B) and (C) of FIG. 8, three-digit numbers indicate values of the signals SRC2, SRC1, and SRC0 in this order. "XXX" is a random setting.

In a case where the transmission device 10 is applied to the communication system 1A, the transmission device 10 operates in the operation mode MA2 (the three-phase signal transmission mode) during the period from the timing t1 to the timing t2, and transmits three-phase signals (the signals SIGA, SIGB, and SIGC). At this time, the signals SRC2, SRC1, and SRC0 are each set to "000" in this example ((B) of FIG. 8). This enables, in the communication system 1A, the capacitance setting section 24 to have a decreased capacitance value in this example, thus making it possible to increase a slew rate of each of the signals SIGA, SIGB, and SIGC.

Further, in a case where the transmission device 10 is applied to the communication system 1B, the transmission device 10 operates in the operation mode MB2 (the differential signal transmission mode) during the period from the timing t1 to the timing t2, and transmits differential signals (the signals SIGP and SIGN). At this time, the signals SRC2, SRC1, and SRC0 are each set to "XXX" (random setting) in this example ((C) of FIG. 8). This makes it possible, in the communication system 1B, to set the slew rate of each of the signals SIGA, SIGB, and SIGC to a desired value, in this example.

In this manner, it is possible, in the transmission device 10, to change a slew rate in accordance with an operation mode, thus making it possible to achieve various interfaces. That is, for example, there is a difference in a specification to be demanded for the slew rate, in some cases, for example, between the communication system 1A that allows for communication by means of a signal format using the three-phase signals (the signals SIGA, SIGB, and SIGC) and the communication system 1B that allows for communication by means of a signal format using the differential signals (the signals SIGN and SIGN). It is possible, in the transmission device 10, to control the slew rate of the output signal in accordance with an operation mode, thus making it possible to so set the slew rate of the output signal as to satisfy the specification to be demanded, even when there is a difference in the specification to be demanded in this manner. As a result, it is possible to achieve various interfaces in the transmission device 10.

Further, the transmission device 10 transmits the single-ended signal during the period before and at the timing t1 and during the period at and after the timing t2. At this time, the signals SRC2, SRC1, and SRC0 are each set to "111" in this example ((B) of FIG. 8 and (C) of FIG. 8). This enables, for example, the transistors 84 to 86 in the capacitance setting section 24 to be less likely to undergo insulation breakdown. That is, for example, in a case where the signals SRC2, SRC1, and SRC0 are each set to "000" during the period before and at the timing t1 and during the period at and after the timing t2, the transistors 84 to 86 are brought into an OFF state, thus causing the drain of each of the transistors 84 to 86 to be in an electrically floating state. Accordingly, when the single-ended signal at the first end of each of the capacitors 81 to 83 appears, a voltage of each drain of the transistors 84 to 86 vary in accordance with the single-ended signal. In this situation, there is a possibility that a voltage of each drain of the transistor 84 to 86 may be increased depending on an electric charge accumulated in each of the capacitors 81 to 83, causing the transistors 84 to 86 to undergo insulation breakdown. During the period before and at the timing t1 and the period at and after the timing t2, the signals SRC2, SRC1, and SRC0 are set to "111" in the transmission device 10, Which therefore causes the transistors 84 to 86 to be brought into an OFF state, thus making it possible to reduce the possibility that transistors 84 to 86 may undergo insulation breakdown.

In this manner, it is possible for the transmission device 10 to have a configuration in which the plurality of operation modes MA1, MA2, MB1, and MB2 are provided to enable the format of the output signal to be changed in accordance with the operation mode and to enable the slew rate of the output signal to be controlled in accordance with the operation mode. Thus, it becomes possible to achieve various interfaces.

This makes it possible, for example, to enhance a degree of freedom in designing a system of an electronic apparatus. That is, in a case where the transmission device 10 is mounted on a processor, it is possible to configure an electronic apparatus using a peripheral device that performs data communication in a signal format by means of the three-phase signals (the signals SIGA, SIGB, and SIGC). It is also possible to configure an electronic apparatus using a peripheral device that performs data communication in a signal format by means of the differential signals (the signals SIGP and SIGN). Further, for example, it is possible to achieve various interfaces using a single processor, thus eliminating necessity of preparing a processor for each interface. This makes it possible to reduce the number of types of processors and thus to reduce the cost.

Comparative Example

Description is given next of workings of the present embodiment in comparison with the comparative example. The present comparative example controls the slew rate of the output signal by varying delay time in a pre-driver.

FIG. 9 illustrates a configuration example of a main part of a transmitter 9R according to the comparative example. The transmitter 9R includes a pre-driver section 22R and a driver section 23R.

The pre-driver section 22R generates signals S1, S2, and S3 on the basis of a signal SIN, The pre-driver section 22R includes pre-drivers 221 to 223. The pre-driver 221 delays the signal SIN by a predetermined amount of delay to thereby generate the signal S1. The pre-driver 222 delays the signal SIN by an amount of delay corresponding to a control signal SEL to thereby generate the signal S2. The signal SIN is delayed by an amount of delay corresponding to the control signal SEL to thereby generate the signal S3.

Specifically, in a case where the control signal SEL is a signal indicating "0" the pre-driver 221 delays the signal SIN by an amount of delay equivalent to two buffers to thereby generate the signal S1, the pre-driver 222 delays the signal SIN by an amount of delay equivalent to two buffers to thereby generate the signal S2, and the pre-driver 223 delays the signal SIN by an amount of delay equivalent to two buffers to thereby generate the signal S3.

Further, in a case where the control signal SEL is a signal indicating "1", the pre-driver 221 delays the signal SIN by an amount of delay equivalent to two buffers to thereby generate the signal S1, the pre-driver 222 delays the signal SIN by an amount of delay equivalent to three buffers to thereby generate the signal S2, and the pre-driver 223 delays the signal SIN by an amount of delay equivalent to four buffers to thereby generate the signal S3.

Further, in a case where the control signal SEL is a signal indicating "2", the pre-driver 221 delays the signal SIN by an amount of delay equivalent to two buffers to thereby generate the signal S1, the pre-driver 222 delays the signal SIN by an amount of delay equivalent to four buffers to thereby generate the signal S2, and the pre-driver 223 delays the signal SIN by an amount of delay equivalent to six buffers to thereby generate the signal S3.

The driver section 23R generates a signal SOUT on the basis of the signals S1, S2, and S3. The driver section 23R includes drivers 231, 232, and 233. The driver 231 operates on the basis of the signal S1. The driver 232 operates on the basis of the signal S2. The driver 233 operates on the basis of the signal S3. Respective output terminals of the drivers 231 to 233 are coupled to one another.

With this configuration, the transmitter 9R controls a slew rate of the signal SOUT on the basis of the control signal SEL. Specifically, for example, in a case where the control signal SEL is a signal indicating "0", the delay amounts in the pre-drivers 221 to 223 become substantially equal to one another in the transmitter 9R. Thus, it is possible for the transmitter 9R to increase the slew rate of the signal SOUT. Further, for example, in a case where the control signal SEL is a signal indicating "1", the delay amount in the pre-driver 222 is longer than the delay amount in the pre-driver 221 by an amount equivalent to one buffer, and the delay amount in the pre-driver 223 is longer than the delay amount in the pre-driver 222 by an amount equivalent to one buffer, in the transmitter 9R. Thus, it is possible, in the transmitter 9R, to decrease the slew rate of the signal SOUT. Further, for example, in a case where the control signal SEL is a signal indicating "2", the delay amount in the pre-driver 222 is longer than the delay amount in the pre-driver 221 by an amount equivalent to two buffers, and the delay amount in the pre-driver 223 is longer than the delay amount in the pre-driver 222 by an amount equivalent to two buffers, in the transmitter 9R. Thus, it is possible, in the transmitter 9R, to further decrease the slew rate of the signal SOUT.

In the transmitter 9R, however, there is a possibility that the amount of delay of the buffer in the pre-drivers 221 to 223 may vary considerably depending on dispersion in processes, fluctuation in a power supply voltage, temperature fluctuation, and the like, thus leading to a possibility that the slew rate may vary considerably. Further, the amount of delay per stage of the buffer is, for example, about several tens of [psec.], which is large as an adjusting step, thus resulting in rough adjustment. Moreover, for example, in a case where the slew rate is set low, many buffers are used, thus increasing power consumption accordingly.

Meanwhile, the transmission device 10 according to the present embodiment varies a capacitance value in the capacitance setting section 24 to thereby control the slew rate. This enables the adjusting step to be set about several [psec.], for example, thus making it possible to perform the adjustment finely. Further, it is possible to suppress power consumption because no buffer is used, unlike the above-described comparative example. Furthermore, it is possible, in the transmission device 10, to suppress an amount of dispersion in the slew rate due to the dispersion in processes of the capacitors 81 to 83 as compared with the case of the above-described comparative example, owing to the capacitors 81 to 83 being configured by the MOM capacitor.

Effects

As described above, the present embodiment has a configuration in which the plurality of operation modes are provided to enable the format of the output signal to be changed in accordance with the operation mode and to enable the slew rate of the output signal to be controlled in accordance with the operation mode. Thus, it becomes possible to achieve various interfaces.

In the present embodiment, the capacitance value in the capacitance setting section is varied to thereby control the slew rate, thus making it possible to allow the adjustment to be fine and to suppress power consumption.

In the present embodiment, the capacitors 81 to 83 are each configured by the MOM capacitor, thus making it possible to suppress an amount of dispersion in the slew rate.

Modification Example 1-1

In the foregoing embodiment, twenty transistors 92 are brought into an ON state to thereby generate the high-level voltage VH; however, this is not limitative. For example, in a case where the sum of the resistance value of the resistor 91 and the resistance value of the transistor 92 in an ON state is smaller than 1000[Ω] due to dispersion in elements during production, the number of the transistors 92 to be brought into an ON state may be decreased. Further, in a case where the sum of the resistance value of the resistor 91 and the resistance value of the transistor 92 in an ON state is larger than 1000[Ω], the number of the transistors 92 to be brought into an ON state may be increased. The same holds true also for the case of generating the low-level voltage VL.

Modification Example 1-2

In the foregoing embodiment, ten transistors 92 and ten transistors 94 are brought into an ON state to thereby generate the medium-level voltage VM; however, this is not limitative. For example, in a case where the sum of the resistance value of the resistor 91 and the resistance value of the transistor 92 in an ON state is smaller than the SUM of the resistance value of the resistor 93 and the resistance value of the transistor 94 in an ON state due to the dispersion in elements during production, the number of the transistors 92 to be brought into an ON state may be made smaller than the number of the transistors 94 to be brought into an ON state. Further, in a case where the sum of the resistance value of the resistor 91 and the resistance value of the transistor 92 in an ON state is larger than the sum of the resistance value of the resistor 93 and the resistance value of the transistor 94 in an ON state, the number of the transistors 92 to be brought into an ON state may be made larger than the number of the transistors 94 to be brought into an ON state. This makes it possible to bring the medium-level voltage VM closer to an intermediate voltage between the high-level voltage VH and the low-level voltage:

Modification Example 1-3

In the foregoing embodiment, the transistors 84 to 86 are brought into an ON state during the period before and at the timing t1 and during the period at and after the timing t2 as illustrated in FIG. 8; however, this is not limitative. Alternatively, the transistors 84 to 86 may be brought into an ON state during at least a portion of the period before and at the timing t1 and the period at and after the timing t2, for example.

2. Second Embodiment

Description is given next of communication systems 5A and 5B according to the second embodiment. In the present embodiment, focus is placed on an edge of an input signal of a driver section to allow each of the signals SIGA, SIGB, and SIGC and the signals SIGP and SIGN not to have a too high slew rate. It is to be noted that components substantially the same as those of the communication systems 1A and 1B according to the foregoing first embodiment are denoted by the same reference numerals, and descriptions thereof are omitted where appropriate.

As illustrated in FIGS. 1A and 1B, the communication systems 5A and 5B each include a transmission device 50. The transmission device 50 includes transmitters 55A, 55B, and 55C.

FIG. 10 illustrates a configuration example of the transmitter 55A. The same holds true also for the transmitters 55B and 55C. The transmitter 55A includes a driver section 53. The driver section 53 generates the signal SIGA on the basis of the signals PU1 to PU24 and PD1 to PD24. The driver section 53 includes twenty-four drivers DVB1 to DVB24 in this example.

The driver DVB1 includes the transistors 92 and 94 and resistors 91, 93, and 99. In other words, the driver DVB1 includes a resistor 99 as an addition to the driver DVA1 (FIG. 4) according to the foregoing embodiment. The resistor 99 is configured by the resistor of the same type (e.g., so-called polysilicon) as the resistors 91 and 93. It is to be noted that this is not limitative; the resistor 99 may be configured by a resistor of a different type from the resistors 91 and 93. A first end of the resistor 99 is supplied with the signal PU1, and a second end of the resistor 99 is coupled to the gate of the transistor 92. The same holds true also for the drivers DVB2 to DVB24.

In this manner, the transmission device 50 has a configuration in which the resistor 99 is inserted at the gate of the transistor 92 in each of the drivers DVB1 to DVB24. Hence, it is possible for the transmission device 50 to allow the output signals not to have a too high slew rate, as described below.

FIG. 11 illustrates an example of a waveform of a difference between the signals SIGP and SIGN at a time when the transmission device 50 is operated in the operation mode MB2 (the differential signal transmission mode). FIG. 12 illustrates an example of a waveform of a difference between the signals SIGI) and SIGN in a case where the resistor 99 is removed in the transmission device 50. As illustrated in FIG. 12, in the case where the resistor 99 is removed, the slew rate is high. Further, in this example, so-called overshoot and undershoot occur which are caused by the high slew rate. In the case where the slew rate is high in this manner, for example, there is a possibility that, tier example, electro-magnetic interference (EMI; Electro-Magnetic Interference) may occur. Meanwhile, it is possible, in the transmission device 50, to set the slew rate at a proper value as illustrated in FIG. 11, owning to the insertion of the resistor 99. As a result, it is possible, in the transmission device 50, to suppress the overshoot and the undershoot and to reduce the possibility of occurrence of the electro-magnetic interference. It is to be noted that, in this example, description has been given, referring, as an example, to the case of operating the transmission device 50 in the operation mode MB2, however, this is not limitative. The same holds true also for the case of operating the transmission device 50 in the operation mode MA2 (the three-phase signal transmission mode).

Description is given next in detail of effects of the resistor 99.

FIG. 13 schematically illustrates an operation example of the transmitter 55A. It is to be noted that this diagram illustrates the driver DVB1, among the drivers DVB1 to DVB24, and only a circuit that supplies a signal to the driver DVB1, among the pre-driver sections 22U and 22D, for the sake of convenience of description. In this FIG. 13, a parasitic capacitance between the gate and the source of the transistor 92 is indicated using a capacitor C92.

In this example, the pre-driver section 22U generates the signal Pit on the basis of the signal PUU1, and supplies the signal PU1 to the first end of the resistor 99 of the driver DVB1. Further, the pre-driver section 22D generates the signal PD1 on the basis of the signal PDD1, and supplies the signal PD1 to the gate of the transistor 94 of the driver DVB1. For example, in a case where there is no resistor 99, transition of the signal PU1 may be conveyed to the source of the transistor 92 via the parasitic capacitance (a feedthrough effect), leading to a possibility that the slew rate of the output signal of the transmitter 55A may be high.

Such a feedthrough effect is more likely to occur as the parasitic capacitance between the gate and the source of the transistor 92 is larger. However, as described below, a gate width W of the transistor 92 is desirably wide for various reasons, resulting in a large parasitic capacitance between the gate and the source of the transistor 92, thus making the feedthrough effect more likely to occur. That is, for example, an amount of dispersion in the resistance value in the resistor 91 is generally smaller than an amount of dispersion in the resistance value in the transistor 92 in an ON state. Thus, there is desirably less contribution of ON-resistance of the transistor 92. In particular, a resistance value of the transistor 92 tends to be increased due to a back-bias effect. For these reasons, the gate width W of the transistor 92 is desirably wide. Further, in the case where the transmission device 50 is operated in the operation mode MA2 (the three-phase signal transmission mode), the voltage Vreg is set to a higher voltage (the voltage VregA) than the case of the operation in the operation mode MB (the differential signal transmission mode). Accordingly, it is desired, in the transmission device 50, that the gate width W of the transistor 92 be wide, in order for a voltage of the high-level voltage VH to be a desired voltage. As a result, the feedthrough effect is likely to occur.

Further, such a feedthrough effect becomes conspicuous, particularly, in a case where the dispersion in processes occurs in which ON-resistance of each of the transistors 92 and 94 is decreased and in which the resistance value of each of the resistors 91 and 93 is increased. One reason for this is that, first, in such conditions, a drive performance of each of the pre-driver sections 22U and 22D is enhanced, causing the transition of the output signal PU1 of the pre-driver section 22U to be steep. Another reason for this is that, secondly, in such conditions, the number of the transistors 92 and 94 to be used is increased in order to set an output impedance of the driver section 53 to about 50[Ω].

Accordingly, in the transmission device 50, the resistor 99 is inserted at the gate of the transistor 92 in each of the drivers DVB1 to DVB24. This allows the resistor 99 to serve as a filter that removes a high-frequency component, thus making it possible to suppress the feedthrough effect.

FIG. 14 illustrates an example of a rising time tr and a falling time tf of each of the signals SIGP and SIGN at a time when the resistance value of the resistor 99 is varied. A characteristic W1 is a characteristic in a process condition in which the rising time tr and the falling time tf each become the longest. This process condition is a condition in which the ON-resistance of each of the transistors 92 and 94 is increased and in which a resistance value of each of the resistors 91, 93, and 99 is decreased. A characteristic W2 is a characteristic in a process condition in which the rising time tr and the falling time tf each become the shortest. This process condition is a condition in which the ON-resistance of each of the transistors 92 and 94 is decreased and in which the resistance value of each of the resistors 91, 93, and 99 is increased.

In the process condition indicated by the characteristic W2, the resistance value of each of the resistors 91, 93, and 99 is increased, thus increasing the number of the transistors 92 and 94 to be used, in order to set the output impedance of the driver section 53 to about 50[Ω], as described above. Further, the drive performance of each of the pre-driver sections 22U and 22D is enhanced, as described above, owing to decreased ON-resistance of each of the transistors 92 and 94, resulting in steep transition of the output signal PU1 of the pre-driver section 22U. That is, this process condition is a condition in which the feedthrough effect is likely to be conspicuous. In such a condition, a high-frequency component related to the transition of the signal PU1 is removed by the resistor 99, and thus larger resistance value of the resistor 99 makes it possible to suppress the feedthrough effect. As a result, it becomes possible to allow the signals SIGP and SIGN not to have a too high slew rate.

Further, for example, in the process condition indicated by the characteristic W1, the resistance value of each of the resistors 91, 93, and 99 is decreased, thus decreasing the number of the transistors 92 and 94 to be used, in order to set the output impedance of the driver section 53 to about 50[Ω]. Further, the drive performance of each of the pre-driver sections 22U and 22D is lowered due to increased ON-resistance of each of the transistors 92 and 94, resulting in gentle transition of the output signal PU1 of the pre-driver section 22U. That is, this process condition is a condition in which the feedthrough effect is weakened. In such a condition, a frequency component related to the transition of the signal PU1 has a low band, and thus this frequency component is not so much removed by the resistor 99. Accordingly, even when the resistance value of the resistor 99 is varied, the rising time tr and the falling time tf do not vary so much. As a result, in the transmission device 50, larger resistance value of the resistor 99 makes it possible to cause a range of dispersion of each of the rising time tr and the falling time tf (the characteristics W1 to W2) to be narrower.

Further, for example, in the transmission device 50, the resistor 99 is configured by the resistor of the same type as the resistors 91 and 93, thus making it possible to control the slew rate effectively. Specifically, for example, in a case where the resistance value of each of the resistors 91 and 93 is increased due to the dispersion in processes, the number of the transistor 92 to be brought into an ON state is increased in order to set the output impedance of the driver section 53 to about 50[Ω]. Therefore, as described above, there is a possibility that the feedthrough effect may be conspicuous, in such a process condition, however, the resistance value of the resistor 99 is also increased, thus enhancing an effect of removing the high-frequency component. This makes it possible to control the slew rate effectively. Further, for example, in a case where the resistance value of each of the resistors 91 and 93 is decreased due to the dispersion in processes, the number of the transistor 92 to be brought into an ON state is decreased in order to set the output impedance of the driver section 53 to about 50[Ω]. Therefore, as described above, the feedthrough effect is weakened. In such a process condition, however, the resistance value of the resistor 99 is also decreased, thus weakening an effect of removing the high-frequency component. This makes it possible to control the slew rate effectively.

As described above, in the present embodiment, the resistor is inserted at the gate of the transistor 92 in the driver, thus making it possible to suppress the feedthrough effect. As a result, it becomes possible to allow the output signal not to have a too high slew rate.

In the present embodiment, the resistor 99 is configured by the resistor of the same type as the resistors 91 and 93, thus making it possible to control the slew rate effectively.

Modification Example 2-1

In the foregoing embodiment, there are provided the capacitance setting section 24 and the driver section 53 including the resistor 99, for example, in the transmitter 55A; however, this is not limitative. Alternatively, for example, the driver section 53 including the resistor 99 may be provided without providing the capacitance setting section 24, as in a transmitter 65A illustrated in FIG. 15.

3. Application Example

Description is given next of an application example of the communication system described in any of the foregoing embodiments and modification examples.

Application Example 1

FIG. 16 illustrates an appearance of a smartphone 300 (a multi-functional mobile phone) to which the communication system according to any of the foregoing embodiments, etc. is applied. Various devices are mounted in the smartphone 300. The communication system according to any of the foregoing embodiments, etc. is applied to a communication system that exchanges data between these devices.

FIG. 17 illustrates a configuration example of an application processor 310 used in the smartphone 300. The application processor 310 includes a central processing unit (CPU) 311, a memory controller 312, a power supply controller 313, an external interface 314, a graphics processing unit (GPU) 315, a media processor 316, a display controller 317, and a mobile industry processor interface (MIPI) interface 318. In this example, the CPU 311, the memory controller 312, the power supply controller 313, the external interface 314, the GPU 315, the media processor 316, and the display controller 317 are coupled to a system bus 319 to allow for mutual data exchange via the system bus 319.

The CPU 311 processes various pieces of information handled in the smartphone 300 in accordance with a program. The memory controller 312 controls a memory 501 used at a time when the CPU 311 performs information processing. The power supply controller 313 controls a power supply of the smartphone 300.

The external interface 314 is an interface for communication with external devices. In this example, the external interface 314 is coupled to a wireless communication section 502 and an image sensor 410. The wireless communication section 502 performs wireless communication with mobile phone base stations. The wireless communication section 502 includes, for example, a baseband section, a radio frequency (RF) front end section, and other components. The image sensor 410 acquires an image, and includes, for example, a CMOS sensor.

The GPU 315 performs image processing. The media processor 316 processes information such as voice, letters, and graphics. The display controller 317 controls the display 504 via the MIPI interface 318. The MIPI interface 318 transmits an image signal to the display 504. As the image signal, for example, a YUV-format signal, an RGB-format signal, or any other format signal may be used. The MIPI interface 318 operates, on the basis of a reference clock supplied from an oscillator circuit 330 including a crystal resonator, for example. For example, the communication system according to any of the foregoing embodiments, etc. is applied to a communication system between the MIPI interface 318 and the display 504.

FIG. 18 illustrates a configuration example of the image sensor 410. The image sensor 410 includes a sensor section 411, an image signal processor (ISP) 412, a joint photographic experts group (MEG) encoder 413, a CPU 414, a random access memory (RAM) 415, a read only memory (ROM) 416, a power supply controller 417, an inter-integrated circuit (I²C) interface 418, and an MIPI interface 419. In this example, these blocks are coupled to a system bus 420 to allow for mutual data exchange via the system bus 420.

The sensor section 411 acquires an image, and is configured by, for example, a CMOS sensor. The ISP 412 performs a predetermined processing on the image acquired by the sensor section 411. The JPEG encoder 413 encodes the image processed by the ISP 412 to generate a JPEG-format image. The CPU 414 controls respective blocks of the image sensor 410 in accordance with a program. The RAM 415 is a memory used at a time when the CPU 414 performs information processing. The ROM 416 stores a program to be executed in the CPU 414, a setting value obtained by calibration, and any other information. The power supply controller 417 controls a power supply of the image sensor 410. The I²C interface 418 receives a control signal from the application processor 310. Although not illustrated, the image sensor 410 also receives a clock signal from the application processor 310, in addition to the control signal. Specifically, the image sensor 410 is configured to be operable on the basis of clock signals of various frequencies. The MIPI interface 419 transmits an image signal to the application processor 310. As the image signal, for example, a YUV-format signal, an RGB-format signal, or any other format signal may be used. The MIPI interface 419 operates on the basis of a reference clock supplied from an oscillator circuit 430 including a crystal resonator, for example. For example, the communication system according to any of the foregoing embodiments, etc. is applied to a communication system between the MIPI interface 419 and the application processor 310.

Application Example 2

FIG. 19 illustrates a configuration example of a vehicle control system 600 to which the communication system according to any of the foregoing embodiments, etc. is applied. The vehicle control system 600 controls operations of an automobile, an electric vehicle, a hybrid electric vehicle, a two-wheeled vehicle, and the like. This vehicle control system 600 includes a driving system control unit 610, a body system control unit 620, a battery control unit 630, an outside-vehicle information detecting unit 640, an in-vehicle information detecting unit 650, and an integrated control unit 660. These units are coupled to one another via a communication network 690. As the communication network 690, for example, a network in conformity with any standard such as a controller area network (CAN), local interconnect network (LIN), local area network (LAN), and FlexRay (Registered Trademark) may be used. Each of the units includes, for example, a microcomputer, a storage section, a drive circuit that drives a device to be controlled, a communication I/F, and the like.

The driving system control unit 610 controls operations of devices related to a driving system of a vehicle. A vehicle state detecting section 611 is coupled to the driving system control unit 610. The vehicle state detecting section 611 detects a state of the vehicle. The vehicle state detecting section 611 includes a gyro sensor, an acceleration sensor, a sensor that detects an amount of operation of an accelerator pedal and a brake pedal or a steering angle, or any other sensor, for example. The driving system control unit 610 controls the operations of the devices related to the driving system of the vehicle on the basis of information detected by the vehicle state detecting section 611. For example, the communication system of any of the foregoing embodiments, etc. is applied to a communication system between the driving system control unit 610 and the vehicle state detecting section 611.

The body system control unit 620 controls operations of various devices mounted on the vehicle, such as a keyless entry system, a power window device, and various lamps.

The battery control unit 630 controls a battery 631. The battery 631 is coupled to the battery control unit 630. The battery 631 supplies power to a driving motor, and includes, for example, a secondary battery, a cooling system, and the like. The battery control unit 630 acquires information such as temperature, an output voltage, and a remaining battery amount from the battery 631, and controls the cooling system, etc. of the battery 631 on the basis of the information. For example, the communication system of any of the foregoing embodiments, etc. is applied to a communication system between the battery control unit 630 and the battery 631.

The outside-vehicle information detecting unit 640 detects information outside the vehicle. An imaging section 641 and an outside-vehicle information detecting section 642 are coupled to the outside-vehicle information detecting unit 640. The imaging section 641 captures an image outside the vehicle, and includes, for example, a time of flight (ToF) camera, a stereo camera, a monocular camera, an infrared camera, and the like. The outside-vehicle information detecting section 642 detects information outside the vehicle, and includes, for example, a sensor that detects weather and climate, a sensor that detects other vehicles around the vehicle, an obstacle, a pedestrian, etc., and any other sensor. The outside-vehicle information detecting unit 640 recognizes, for example, weather and climate, a road surface condition, etc. on the basis of the image acquired by the imaging section 641 as well as the information detected by the outside-vehicle information detecting section 642, and detects objects such as other vehicles around the vehicle, an obstacle, a pedestrian, a sign. and letters on a road, or detects a distance between the object and the vehicle. For example, the communication system of any of the foregoing embodiments, etc. is applied to a communication system between the outside-vehicle information detecting unit 640 and each of the imaging section 641 and the outside-vehicle information detecting section 642.

The in-vehicle information detecting unit 650 detects information inside the vehicle. A driver state detecting section 651 is coupled to the in-vehicle information detecting unit 650. The driver state detecting section 651 detects a state of a driver, and includes, for example, a camera, a biosensor, a microphone, and the like. The in-vehicle information detecting unit 650 monitors, for example, a degree of fatigue of the driver or a degree of concentration of the driver, whether the driver is dozing, and any other factor, on the basis of information detected by the driver state detecting section 651. For example, the communication system of any of the foregoing embodiments, etc. is applied to a communication system between the in-vehicle information detecting unit 650 and the driver state detecting section 651.

The integrated control unit 660 controls operations of the vehicle control system 600. An operating section 661, a display section 662, and an instrument panel 663 are coupled to the integrated control unit 660. An occupant operates the operating section 661. The operating section 661 includes, for example, a touch panel, various buttons, switches, and the like. The display section 662 displays an image, and is configured by, for example, a liquid crystal display panel, etc. The instrument panel 663 displays a state of the vehicle, and includes meters such as a speed meter, various warning lamps, and the like. For example, the communication system of any of the foregoing embodiments, etc. is applied to a communication system between the integrated control unit 660 and each of the operating section 661, the display section 662, and the instrument panel 663.

Although the technology has been described above referring to some embodiments and modification examples as well as application examples to electronic apparatuses, the technology is not limited to these embodiments, etc., and may be modified in a variety of ways.

For example, in the foregoing respective embodiments, etc., ten of the twenty-four transistors 92 and ten of the twenty-four transistors 94 are brought into an ON state in the case where the transmission devices 10 and 50 each operate in the operation mode MA2, for example, to thereby generate the medium-level voltage VM; however, this is not limitative. Alternatively, for example, the twenty-four transistors 92 and the twenty-four transistors 94 may be brought into an OFF state. In this case, the resistors 35A to 35B in the receiver generate the medium-level voltage VM on the basis of the high-level voltage VH and the low-level voltage VL.

It is to be noted that effects described herein are merely illustrative and are not limitative, and may have other effects.

It is to be noted that the technology may have the following configurations.

(1)
A transmission device including:
a controller that selects one of a plurality of operation modes; and
a first transmitter including a first capacitance setting section that sets a load capacitance in accordance with an operation mode selected by the controller, the first transmitter being configured to be able to output, to a first output terminal, a first signal having a signal format according to the selected operation mode, among a plurality of signal formats.

(2)
The transmission device according to 1), in which
the plurality of signal formats include a first signal format and a second signal format,
the first signal format transitions among a first voltage, a second voltage, and a third voltage between the first voltage and the second voltage, and the second signal format transitions between a fourth voltage and a fifth voltage.

(3)
The transmission device according to (2), in which the first capacitance setting section sets a capacitance value in a case where the first signal has the second signal format higher than a capacitance value in a case where the first signal has the first signal format.

(4)
The transmission device according to (2) or (3), further including:
a second transmitter including a second capacitance setting section that sets a load capacitance in accordance with the selected operation mode, the second transmitter being configured to be able to output, to a second output terminal, a second signal having a signal format according to the selected operation mode, among the plurality of signal formats; and
a third transmitter including a third capacitance setting section that sets a load capacitance in accordance with the selected operation mode, the third transmitter being configured to be able to output, to a third output terminal, a third signal having a signal format according to the selected operation mode, among the plurality of signal formats.

(5)
The transmission device according to (4), in which
the plurality of operation modes include a first operation mode and a second operation mode, and
in a case where the selected operation mode is the first operation mode, the first signal, the second signal, and the third signal have the first signal format, and respective voltages at the first output terminal, the second output terminal, and the third output terminal are voltages different from one another.

(6)
The transmission device according to (5), in which, in a case where the selected operation mode is the second operation mode, the first signal and the second signal have the second signal format, and respective voltages at the first output terminal and the second output terminal are voltages different from each other.

(7)
The transmission device according to any one of (1) to (6), in which the first transmitter includes a plurality of first circuits that are coupled in parallel with one another, the plurality of first circuits each including a first resistor and a first transistor that are provided on a path from a first power supply to the first output terminal.

(8)
The transmission device according to (7), in which the plurality of first circuits each further include a second resistor coupled to a gate of the first transistor.

(9)
The transmission device according to (7) or (8), in which the first transmitter further includes a plurality of second circuits that are coupled in parallel with one another, the plurality of second circuits each including a third resistor and a second transistor that are provided on a path from a second power supply to the first output terminal.

(10)
The transmission device according to any one of (1) to (9), further including a fourth transmitter that outputs a fourth signal to the first output terminal, in which
the controller further controls the fourth transmitter to output the fourth signal during at least a portion of a period other than a period during Which the first transmitter outputs the first signal.

(11)
The transmission device according to (10), in which the first capacitance setting section includes a capacitor and a switch that are provided on a path from the first output terminal to a third power supply.

(12)
The transmission device according to (11), in which the first capacitance setting section brings the switch into an ON state during at least a portion of a period during which the fourth transmitter outputs the fourth signal.

(13)
A transmission device including:
a controller that selects one of a plurality of operation modes; and
a first transmitter configured to be able to output, to a first output terminal, a first signal having a signal format according to an operation mode selected by the controller, among a plurality of signal formats,
the first transmitter including a plurality of first circuits that are coupled in parallel with one another, the plurality of first circuits each including a first resistor and a first transistor that are provided on a path from a first power supply to the first output terminal, and a second resistor coupled to a gate of the first transistor.

(14)
A communication system including:
a transmission device; and
a reception device,
the transmission device including
a controller that selects one of a plurality of operation modes, and
a first transmitter including a first capacitance setting section that sets a load capacitance in accordance with an operation mode selected by the controller, the first transmitter being configured to be able to output, to a first output terminal, a first signal having a signal format according to the selected operation mode, among a plurality of signal formats.

This application claims the benefit of Japanese Priority Patent Application JP2016-022012 filed with the Japan Patent Office on Feb. 8, 2016, the entire contents of which are incorporated herein by reference.

It should be understood by those skilled in the art that various modifications, combinations, sub-combinations, and alterations may occur in accordance with design requirements and other factors insofar as they are within the scope of the appended claims or the equivalents thereof.

The invention claimed is:

1. A transmission device comprising:
a controller that selects one of a plurality of operation modes; and
a first transmitter including a first capacitance setting section that sets a load capacitance in accordance with an operation mode selected by the controller, the first transmitter being configured to be able to output, to a first output terminal, a first signal having a signal format according to the selected operation mode, among a plurality of signal formats, wherein
the plurality of signal formats include a first signal format and a second signal format,
the first signal format transitions among a first voltage, a second voltage, and a third voltage between the first voltage and the second voltage, and
the second signal format transitions between a fourth voltage and a fifth voltage.

2. The transmission device according to claim 1, wherein the first capacitance setting section sets a capacitance value in a case where the first signal has the second signal format higher than a capacitance value in a case where the first signal has the first signal format.

3. The transmission device according to claim 1, further comprising:
a second transmitter including a second capacitance setting section that sets a load capacitance in accordance with the selected operation mode, the second transmitter being configured to be able to output, to a second output terminal, a second signal having a signal format according to the selected operation mode, among the plurality of signal formats; and
a third transmitter including a third capacitance setting section that sets a load capacitance in accordance with the selected operation mode, the third transmitter being configured to be able to output, to a third output terminal, a third signal having a signal format according to the selected operation mode, among the plurality of signal formats.

4. The transmission device according to claim 3, wherein the plurality of operation modes include a first operation mode and a second operation mode, and
in a case where the selected operation mode is the first operation mode, the first signal, the second signal, and the third signal have the first signal format, and respective voltages at the first output terminal, the second output terminal, and the third output terminal are voltages different from one another.

5. The transmission device according to claim 4, wherein, in a case where the selected operation mode is the second operation mode, the first signal and the second signal have the second signal format, and respective voltages at the first output terminal and the second output terminal are voltages different from each other.

6. The transmission device according to claim 3, further comprising a fourth transmitter that outputs a fourth signal to the first output terminal, wherein
the controller further controls the fourth transmitter to output the fourth signal during at least a portion of a period other than a period during which the first transmitter outputs the first signal.

7. The transmission device according to claim 6, wherein the first capacitance setting section includes a capacitor and a switch that are provided on a path from the first output terminal to a third power supply.

8. The transmission device according to claim 7, wherein the first capacitance setting section brings the switch into an ON state during at least a portion of a period during which the fourth transmitter outputs the fourth signal.

9. The transmission device according to claim 1, wherein the first transmitter includes a plurality of first circuits that are coupled in parallel with one another, the plurality of first circuits each including a first resistor and a first transistor that are provided on a path from a first power supply to the first output terminal.

10. A transmission device comprising:
a controller that selects one of a plurality of operation modes; and
a first transmitter including a first capacitance setting section that sets a load capacitance in accordance with an operation mode selected by the controller, the first transmitter being configured to be able to output, to a first output terminal, a first signal having a signal format according to the selected operation mode, among a plurality of signal formats, wherein
the first transmitter includes a plurality of first circuits that are coupled in parallel with one another, the plurality of first circuits each including a first resistor and a first transistor that are provided on a path from a first power supply to the first output terminal, and the plurality of first circuits each further include a second resistor coupled to a gate of the first transistor.

11. The transmission device according to claim 10, wherein the first transmitter further includes a plurality of second circuits that are coupled in parallel with one another, the plurality of second circuits each including a third resistor and a second transistor that are provided on a path from a second power supply to the first output terminal.

12. A transmission device comprising:
a controller that selects one of a plurality of operation modes; and
a first transmitter configured to be able to output, to a first output terminal, a first signal having a signal format according to an operation mode selected by the controller, among a plurality of signal formats,
the first transmitter including a plurality of first circuits that are coupled in parallel with one another, the plurality of first circuits each including a first resistor and a first transistor that are provided on a path from a first power supply to the first output terminal, and a second resistor coupled to a gate of the first transistor.

13. A communication system comprising:
a transmission device; and
a reception device,
the transmission device including a controller that selects one of a plurality of operation modes, and
a first transmitter including a first capacitance setting section that sets a load capacitance in accordance with an operation mode selected by the controller, the first transmitter being configured to be able to output, to a first output terminal, a first signal having a signal format according to the selected operation mode, among a plurality of signal formats, wherein
the plurality of signal formats include a first signal format and a second signal format,
the first signal format transitions among a first voltage, a second voltage, and a third voltage between the first voltage and the second voltage, and
the second signal format transitions between a fourth voltage and a fifth voltage.

14. The communication system according to claim 13, wherein the first capacitance setting section sets a capacitance value in a case where the first signal has the second signal format higher than a capacitance value in a case where the first signal has the first signal format.

15. The communication system according to claim 13, further comprising:
a second transmitter including a second capacitance setting section that sets a load capacitance in accordance with the selected operation mode, the second transmitter being configured to be able to output, to a second output terminal, a second signal having a signal format according to the selected operation mode, among the plurality of signal formats; and
a third transmitter including a third capacitance setting section that sets a load capacitance in accordance with the selected operation mode, the third transmitter being configured to be able to output, to a third output terminal, a third signal having a signal format according to the selected operation mode, among the plurality of signal formats.

16. The communication system according to claim 15, wherein
the plurality of operation modes include a first operation mode and a second operation mode, and
in a case where the selected operation mode is the first operation mode, the first signal, the second signal, and the third signal have the first signal format, and respective voltages at the first output terminal, the second output terminal, and the third output terminal are voltages different from one another.

17. The communication system according to claim 16, wherein, in a case where the selected operation mode is the second operation mode, the first signal and the second signal have the second signal format, and respective voltages at the first output terminal and the second output terminal are voltages different from each other.

18. The communication system according to claim 13, wherein the first transmitter includes a plurality of first circuits that are coupled in parallel with one another, the plurality of first circuits each including a first resistor and a first transistor that are provided on a path from a first power supply to the first output terminal.

* * * * *